United States Patent
Deselaers et al.

(10) Patent No.: US 12,242,695 B1
(45) Date of Patent: Mar. 4, 2025

(54) SYSTEM AND METHOD FOR STYLUS DETECTION

(71) Applicant: Apple Inc., Cupertino, CA (US)

(72) Inventors: Thomas Deselaers, Zurich (CH); Peder Blekken, Morgan Hill, CA (US); Francisco Alvaro Munoz, Zurich (CH); Ryan S. Dixon, Redwood City, CA (US); Nima Ferdosi, San Jose, CA (US); Tianchang Gu, San Jose, CA (US); Mayank Garg, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/462,234

(22) Filed: Sep. 6, 2023

Related U.S. Application Data

(60) Provisional application No. 63/374,746, filed on Sep. 6, 2022.

(51) Int. Cl.
*G06F 3/041* (2006.01)
*G06F 3/0354* (2013.01)
*G06F 3/038* (2013.01)

(52) U.S. Cl.
CPC ........ *G06F 3/0418* (2013.01); *G06F 3/03545* (2013.01); *G06F 3/038* (2013.01); *G06F 3/04166* (2019.05)

(58) Field of Classification Search
CPC .. G06F 3/03545; G06F 3/038; G06F 3/04166; G06F 3/0418
See application file for complete search history.

(56) References Cited

U.S. PATENT DOCUMENTS

| | | | |
|---|---|---|---|
| 5,414,227 A | 5/1995 | Schubert et al. |
| 6,667,740 B2 | 12/2003 | Ely et al. |
| 7,567,414 B2 | 7/2009 | Bertin et al. |
| 8,199,132 B1 | 6/2012 | Oda et al. |

(Continued)

FOREIGN PATENT DOCUMENTS

| | | |
|---|---|---|
| CN | 107368203 A | 11/2017 |
| CN | 207410026 U | 5/2018 |

(Continued)

OTHER PUBLICATIONS

Advisory Action received for U.S. Appl. No. 14/848,289, mailed on Sep. 25, 2018, 3 pages.

(Continued)

*Primary Examiner* — Gene W Lee
(74) *Attorney, Agent, or Firm* — Kubota & Basol LLP

(57) ABSTRACT

In some examples, an electronic device including a touch screen can sense a stylus proximate to the touch screen. For example, the user can draw or write with the stylus to create a simulated drawing or simulated handwriting displayed on the touch screen. In some examples, the electronic device can sense a series of "points" corresponding to the location of the stylus over time while the drawing/writing input was provided. In some situations, noise in the stylus data can cause the electronic device not to sense one or more noisy points included in the drawing or handwriting input. In some examples, the electronic device can interpolate the noisy points based on sensed points before and/or after the time of the skipped points.

20 Claims, 13 Drawing Sheets

(56) References Cited

U.S. PATENT DOCUMENTS

| | | |
|---|---|---|
| 8,493,359 B2 | 7/2013 | Wright et al. |
| 8,547,114 B2 | 10/2013 | Kremin |
| 8,587,535 B2 | 11/2013 | Oda et al. |
| 8,657,814 B2 | 2/2014 | Werneth et al. |
| 8,773,405 B1 | 7/2014 | Ryshtun et al. |
| 8,816,985 B1 | 8/2014 | Tate et al. |
| 8,854,147 B2 | 10/2014 | Lin |
| 8,947,397 B2 | 2/2015 | Fujii |
| 8,952,930 B2 | 2/2015 | Perski et al. |
| 9,018,547 B2 | 4/2015 | Rimon et al. |
| 9,046,940 B2 | 6/2015 | Oyama |
| 9,098,184 B2 * | 8/2015 | Akiyama ............. G06F 3/0488 |
| 9,117,677 B2 | 8/2015 | Ma et al. |
| 9,189,088 B2 | 11/2015 | Tsao et al. |
| 9,201,547 B2 | 12/2015 | Elias et al. |
| 9,201,556 B2 | 12/2015 | Free et al. |
| 9,256,321 B2 * | 2/2016 | Wang ................. G06F 3/0418 |
| 9,310,943 B1 | 4/2016 | Omelchuk et al. |
| 9,383,835 B2 | 7/2016 | Lo et al. |
| 9,465,456 B2 | 10/2016 | Pant et al. |
| 9,529,463 B1 * | 12/2016 | Ramani ................. G09G 5/00 |
| 9,594,440 B2 | 3/2017 | Park et al. |
| 9,606,680 B1 | 3/2017 | Sundara-rajan |
| 9,612,671 B1 | 4/2017 | Blaszczak et al. |
| 9,665,184 B2 | 5/2017 | Hara |
| 10,095,406 B2 * | 10/2018 | Ahmed ............. G06F 3/04886 |
| 10,455,115 B2 | 10/2019 | Zyskind et al. |
| 10,558,293 B2 | 2/2020 | Wigdor et al. |
| 11,079,862 B2 | 8/2021 | Brunet et al. |
| 11,079,888 B1 | 8/2021 | Gray et al. |
| 11,287,926 B1 | 3/2022 | Shahsavari et al. |
| 11,435,851 B2 | 9/2022 | Rosenberg et al. |
| 11,526,240 B1 | 12/2022 | Bechstein et al. |
| 2002/0158923 A1 * | 10/2002 | Panagrossi, III ..... G06F 3/0488 715/864 |
| 2005/0264528 A1 | 12/2005 | Burry |
| 2007/0195068 A1 | 8/2007 | Kable et al. |
| 2008/0156546 A1 | 7/2008 | Hauck |
| 2008/0266267 A1 | 10/2008 | Chang |
| 2009/0008162 A1 | 1/2009 | Yang et al. |
| 2009/0273579 A1 | 11/2009 | Zachut et al. |
| 2009/0289922 A1 | 11/2009 | Henry |
| 2010/0117661 A1 | 5/2010 | Bruwer et al. |
| 2010/0315384 A1 | 12/2010 | Hargreaves et al. |
| 2011/0063154 A1 | 3/2011 | Hotelling et al. |
| 2011/0297458 A1 | 12/2011 | Mao et al. |
| 2012/0007608 A1 | 1/2012 | Hadwen et al. |
| 2012/0068957 A1 | 3/2012 | Puskarich et al. |
| 2012/0146960 A1 | 6/2012 | Shih et al. |
| 2012/0154340 A1 | 6/2012 | Vuppu et al. |
| 2012/0268428 A1 | 10/2012 | Nakata et al. |
| 2012/0278031 A1 | 11/2012 | Oda et al. |
| 2012/0327042 A1 | 12/2012 | Harley et al. |
| 2012/0331546 A1 | 12/2012 | Falkenburg et al. |
| 2013/0088465 A1 | 4/2013 | Geller et al. |
| 2013/0106718 A1 | 5/2013 | Sundara-rajan |
| 2013/0141397 A1 | 6/2013 | Dunagan |
| 2013/0194225 A1 | 8/2013 | Shen et al. |
| 2013/0285900 A1 | 10/2013 | Liu |
| 2013/0321355 A1 | 12/2013 | Teiblum |
| 2014/0146009 A1 | 5/2014 | Huang |
| 2015/0091856 A1 | 4/2015 | Park et al. |
| 2015/0123923 A1 | 5/2015 | Stern |
| 2015/0123932 A1 | 5/2015 | Collins |
| 2015/0138164 A1 | 5/2015 | Hinson |
| 2015/0160744 A1 | 6/2015 | Mohindra et al. |
| 2015/0193024 A1 | 7/2015 | Kai et al. |
| 2015/0277618 A1 | 10/2015 | Bulea |
| 2015/0309598 A1 | 10/2015 | Zeliff et al. |
| 2015/0355732 A1 | 12/2015 | Mann |
| 2016/0048224 A1 | 2/2016 | Brunet et al. |
| 2016/0162045 A1 | 6/2016 | Vincent |
| 2016/0179271 A1 | 6/2016 | Vandermeijden |
| 2016/0266663 A1 | 9/2016 | Holsen |
| 2016/0313825 A1 | 10/2016 | Hotelling et al. |
| 2016/0320913 A1 | 11/2016 | Gao et al. |
| 2017/0010697 A1 | 1/2017 | Jiang et al. |
| 2017/0068344 A1 | 3/2017 | Bhandari et al. |
| 2017/0075441 A1 | 3/2017 | Leigh et al. |
| 2017/0075446 A1 | 3/2017 | Vandermeijden |
| 2017/0212635 A1 | 7/2017 | Cordeiro et al. |
| 2017/0262076 A1 | 9/2017 | Hara |
| 2017/0262100 A1 | 9/2017 | Leigh et al. |
| 2017/0285772 A1 | 10/2017 | Yamamoto |
| 2017/0308189 A1 | 10/2017 | Peretz et al. |
| 2017/0344174 A1 | 11/2017 | Pant et al. |
| 2018/0081477 A1 | 3/2018 | Picciotto et al. |
| 2018/0181245 A1 | 6/2018 | Beck et al. |
| 2018/0246585 A1 | 8/2018 | Hara |
| 2018/0284909 A1 | 10/2018 | Laslo et al. |
| 2018/0309190 A1 | 10/2018 | Niakan |
| 2018/0338065 A1 | 11/2018 | Zyskind et al. |
| 2019/0155408 A1 | 5/2019 | Hou et al. |
| 2019/0155411 A1 | 5/2019 | Kinrot et al. |
| 2019/0220187 A1 | 7/2019 | Budd |
| 2019/0324561 A1 | 10/2019 | Anderson et al. |
| 2019/0324564 A1 | 10/2019 | Brunet et al. |
| 2019/0339356 A1 | 11/2019 | Schildknecht et al. |
| 2019/0371787 A1 | 12/2019 | Mandal |
| 2020/0019257 A1 | 1/2020 | Chang et al. |
| 2020/0110482 A1 | 4/2020 | Vu et al. |
| 2020/0159386 A1 | 5/2020 | Saito et al. |
| 2020/0192521 A1 | 6/2020 | Case et al. |
| 2020/0201505 A1 | 6/2020 | Jung et al. |
| 2020/0218322 A1 | 7/2020 | Gray et al. |
| 2021/0026464 A1 | 1/2021 | Yamada et al. |
| 2021/0232240 A1 | 7/2021 | Smith |
| 2021/0240325 A1 | 8/2021 | Smith |
| 2021/0255735 A1 | 8/2021 | Gray et al. |
| 2021/0286493 A1 | 9/2021 | Wang et al. |
| 2021/0303151 A1 | 9/2021 | Morrison et al. |
| 2021/0303152 A1 | 9/2021 | Hosur et al. |
| 2021/0325444 A1 | 10/2021 | Chong |
| 2022/0091685 A1 | 3/2022 | Bechstein et al. |
| 2022/0095443 A1 | 3/2022 | Bechstein et al. |
| 2022/0100310 A1 | 3/2022 | Shahsavari et al. |
| 2022/0100341 A1 | 3/2022 | Seyed Mousavi et al. |
| 2022/0334658 A1 | 10/2022 | Dekel et al. |
| 2023/0152911 A1 | 5/2023 | Bechstein et al. |
| 2023/0273687 A1 | 8/2023 | Bechstein et al. |

FOREIGN PATENT DOCUMENTS

| | | |
|---|---|---|
| EP | 2466431 A1 | 6/2012 |
| EP | 2624104 A2 | 8/2013 |
| EP | 2672494 A1 | 12/2013 |
| EP | 2813918 A1 | 12/2014 |
| EP | 2624104 A3 | 3/2016 |
| EP | 3326050 A1 | 5/2018 |
| WO | 2017/044428 A1 | 3/2017 |
| WO | 2019/036857 A1 | 2/2019 |
| WO | 2020/023640 A1 | 1/2020 |
| WO | 2020/027818 A1 | 2/2020 |
| WO | 2021/202612 A2 | 10/2021 |
| WO | 2022/046956 A1 | 3/2022 |

OTHER PUBLICATIONS

Final Office Action received for U.S. Appl. No. 14/848,289, mailed on Jun. 21, 2018, 11 pages.
Final Office Action received for U.S. Appl. No. 17/031,570, mailed on Mar. 30, 2023, 12 pages.
Final Office Action received for U.S. Appl. No. 17/031,570, mailed on May 13, 2022, 12 pages.
Final Office Action received for U.S. Appl. No. 17/448,866, mailed on Jun. 1, 2023, 19 pages.
International Search Report received for PCT Patent Application No. PCT/US2016/048590, mailed on Feb. 7, 2017, 6 pages.
International Search Report received for PCT Patent Application No. PCT/US2016/048630, mailed on Nov. 18, 2016, 3 pages.
Non Final Office Action received for U.S. Appl. No. 14/848,277, mailed on Nov. 18, 2016, 18 pages.

(56) References Cited

OTHER PUBLICATIONS

Non Final Office Action received for U.S. Appl. No. 14/848,277, mailed on Sep. 19, 2017, 11 pages.
Non-Final Office Action received for U.S. Appl. No. 14/848,289, mailed on Nov. 3, 2017, 18 pages.
Non-Final Office Action received for U.S. Appl. No. 14/848,289, mailed on Nov. 17, 2016, 11 pages.
Non-Final Office Action received for U.S. Appl. No. 16/836,789, mailed on Oct. 1, 2021, 27 pages.
Non-Final Office Action received for U.S. Appl. No. 17/031,570, mailed on Aug. 10, 2023, 11 pages.
Non-Final Office Action received for U.S. Appl. No. 17/031,570, mailed on Dec. 17, 2021, 11 pages.
Non-Final Office Action received for U.S. Appl. No. 17/448,866, mailed on Nov. 10, 2022, 20 pages.
Non-Final Office Action received for U.S. Appl. No. 17/031,549, mailed on Oct. 20, 2021, 13 pages.
Non-Final Office Action received for U.S. Appl. No. 17/031,549, mailed on Sep. 29, 2021, 14 pages.
Non-Final Office Action received for U.S. Appl. No. 17/031,570, mailed on Dec. 12, 2022, 11 pages.
Notice of Allowance received for U.S. Appl. No. 14/848,277, mailed on May 8, 2018, 5 pages.
Notice of Allowance received for U.S. Appl. No. 14/848,289, mailed on Nov. 21, 2018, 6 pages.
Notice of Allowance received for U.S. Appl. No. 16/836,789, mailed on Feb. 18, 2022, 9 pages.
Notice of Allowance received for U.S. Appl. No. 16/836,789, mailed on May 25, 2022, 8 pages.
Notice of Allowance received for U.S. Appl. No. 17/031,549, mailed on Feb. 1, 2022, 8 pages.
Notice of Allowance received for U.S. Appl. No. 17/031,549, mailed on May 6, 2022, 8 pages.
Notice of Allowance received for U.S. Appl. No. 17/161,499, mailed on Aug. 12, 2021, 9 pages.
Notice of Allowance received for U.S. Appl. No. 17/161,499, mailed on Dec. 1, 2021, 8 pages.
Notice of Allowance received for U.S. Appl. No. 17/448,774, mailed on Aug. 16, 2022, 8 pages.
Notice of Allowance received for U.S. Appl. No. 17/448,774, mailed on May 4, 2022, 10 pages.
Notice of Allowance received for U.S. Appl. No. 17/448,866, mailed on Oct. 12, 2023, 5 pages.
Non-Final Office Action received for U.S. Appl. No. 18/468,532, mailed on May 10, 2024, 10 pages.
Notice of Allowance received for U.S. Appl. No. 17/031,570, mailed on Jan. 23, 2024, 6 pages.

\* cited by examiner

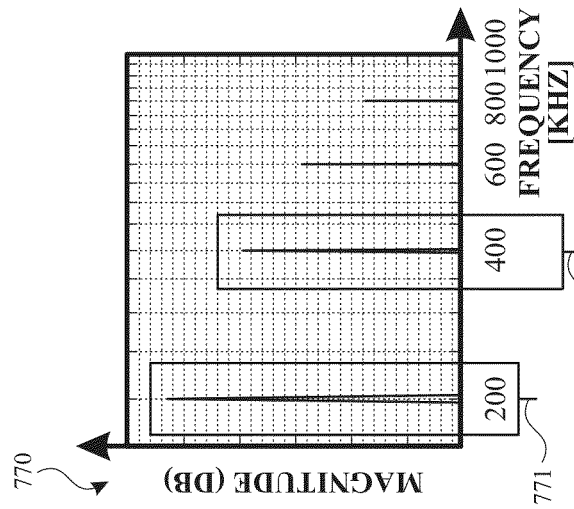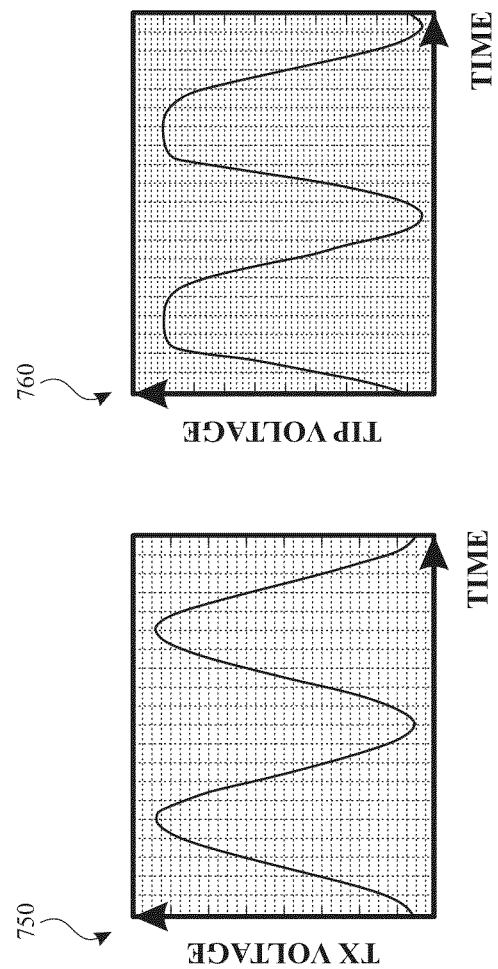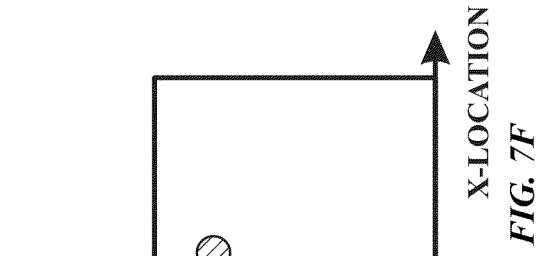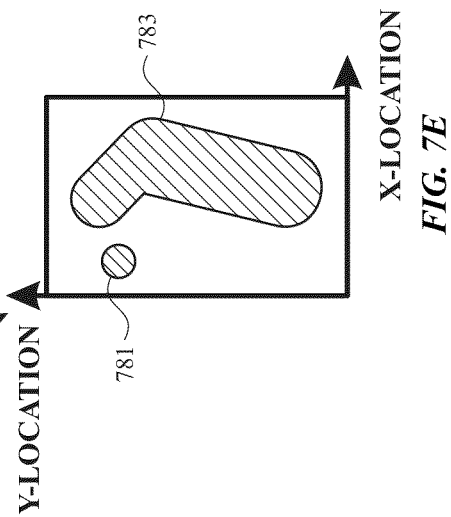

△ = skipped — 902
○ = sensed — 904

SYSTEM AND METHOD FOR STYLUS DETECTION

CROSS-REFERENCE TO RELATED APPLICATIONS

This application claims the benefit of U.S. Provisional Application No. 63/374,746, filed Sep. 6, 2022, the content of which is incorporated herein by reference in its entirety for all purposes.

FIELD

This relates to detecting input devices and, more particularly, to mitigating the effects of noise when detecting input devices.

BACKGROUND

Many types of input devices are presently available for performing operations in a computing system, such as buttons or keys, mice, trackballs, joysticks, touch panels, touch screens and the like. Touch screens, in particular, are popular because of their ease and versatility of operation as well as their declining price. Touch screens can include a touch panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch panel using a finger, stylus or other object at a location often dictated by a user interface (UI) being displayed by the display device. In general, touch screens can recognize a touch and the position of the touch on the touch panel, and the computing system can then interpret the touch in accordance with the display appearing at the time of the touch, and thereafter can perform one or more actions based on the touch. In some examples, touch panels can be included in other input devices that are separate from any display screen, such as trackpads. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

In some examples, the electronic device is able to detect objects proximate to or touching a touch-sensitive surface such as a touch screen. For example, the electronic device can detect conductive objects, such as human fingers, palms, and hands and input devices, such as a stylus. In some examples, a stylus can be an active stylus that includes a power supply and generates a stylus signal that can be detected by the electronic device. The electronic device can detect an active stylus by detecting the stylus signal, which can capacitively couple to one or more touch electrodes of the touch-sensitive surface. In some examples, a stylus can be a passive stylus that does not include a power supply. The passive stylus can include one or more conductive components that can capacitively couple to an electrode of the touch screen to produce or modify a signal sensed by the electronic device.

SUMMARY

This relates to detecting input devices and, more particularly, to mitigating the effects of noise when detecting input devices. In some examples, an electronic device detects a stylus and performs an operation in accordance with detected location(s) and/or movement of the stylus. For example, the electronic device displays simulated markings "drawn" using the stylus as a virtual pen, pencil, or other writing implement. In some situations, stylus data may include noise that causes the electronic device to inaccurately determine the location of the stylus. In these situations, noise can cause the electronic device to display simulated markings that do not correspond to the movement of the stylus made by the user. In some examples, noise mitigation techniques can be used to reduce the errors in displaying simulated markings in response to stylus detection. For example, the electronic device can identify one or more outlier "points" the stylus moved through that are not in line with other detected "points" and correct (e.g., remove, change the location of) the outlier "points."

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 7B illustrates an exemplary drive signal applied to a drive line of the touch-sensitive surface according to some examples of the disclosure.

FIG. 7C illustrates an exemplary signal generated at a stylus in response to a drive signal according to some examples of the disclosure.

FIG. 7D illustrates exemplary frequency content of a voltage signal at the tip of an exemplary stylus according to some examples of the disclosure.

FIG. 7E illustrates an exemplary image of touch that includes a contact of the stylus and a contact of another object according to some examples of the disclosure.

FIG. 7F illustrates an exemplary image of touch that includes a contact of an exemplary stylus according to some examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to detecting input devices and, more particularly, to mitigating the effects of noise when detecting input devices. In some examples, an electronic device detects a stylus and performs an operation in accordance with detected location(s) and/or movement of the stylus. For example, the electronic device displays simulated markings "drawn" using the stylus as a virtual pen, pencil, or other writing implement. In some situations, stylus data may include noise that causes the electronic device to inaccurately determine the location of the stylus. In these situations, noise can cause the electronic device to display simulated markings that do not correspond to the movement of the stylus made by the user. In some examples, noise mitigation techniques can be used to reduce the errors in displaying simulated markings in response to stylus detection. For example, the electronic device can identify one or more outlier "points" the stylus moved through that are not in line with other detected "points" and correct (e.g., remove, change the location of) the outlier "points."

Figure 1A:
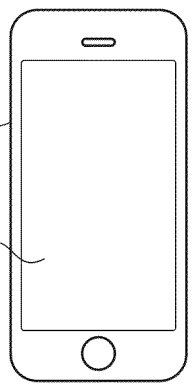
FIGS. 1A-1E illustrate example systems that can implement noise mitigation techniques according to examples of the disclosure.
Figure 1B:
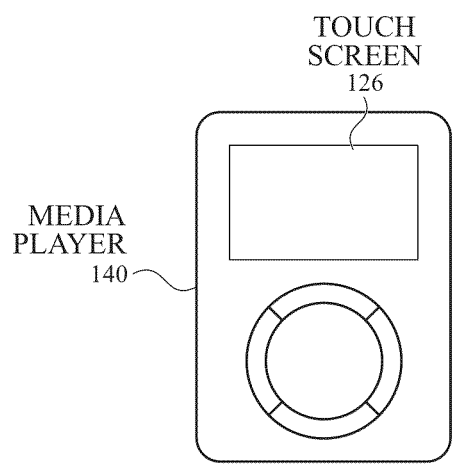
Figure 1C:
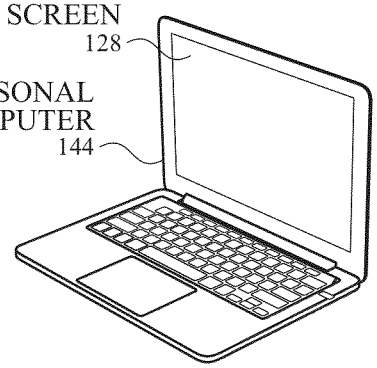
Figure 1D:
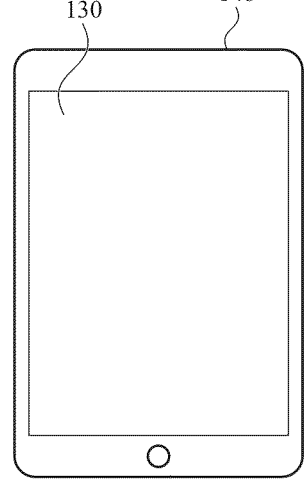
Figure 1E:
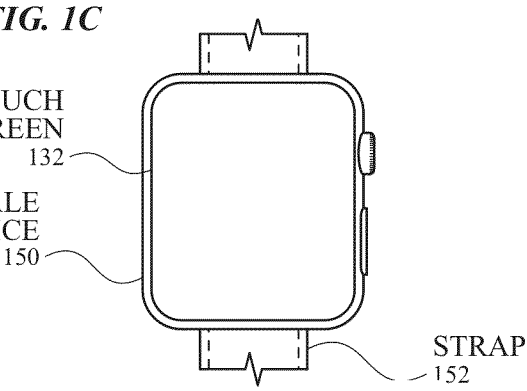

FIGS. 1A-1E illustrate example systems that can use noise mitigation techniques according to examples of the disclosure. FIG. 1A illustrates an example mobile telephone 136 that includes a touch screen 124 that can use noise mitigation techniques according to examples of the disclosure. FIG. 1B illustrates an example digital media player 140 that includes a touch screen 126 that can use noise mitigation techniques according to examples of the disclosure. FIG. 1C illustrates an example personal computer 144 that includes a touch screen 128 that can use noise mitigation techniques according to examples of the disclosure. FIG. 1D illustrates an example tablet computing device 148 that includes a touch screen 130 that can use noise mitigation techniques according to examples of the disclosure. FIG. 1E illustrates an example wearable device 150 that includes a touch screen 132 and can be attached to a user using a strap 152 and that can use noise mitigation techniques according to examples of the disclosure. It is understood that a touch screen and noise mitigation techniques can be implemented in other devices as well. Additionally, it should be understood that although the disclosure herein primarily focuses on touch screens, the disclosure of noise mitigation techniques can be implemented for devices including touch sensor panels (and displays) that may not be implemented as a touch screen.

In some examples, touch screens 124, 126, 128, 130 and 132 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen can include a plurality of touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 132 can be based on mutual capacitance. A mutual capacitance based touch system can include electrodes arranged as drive and sense lines that may cross over each other (e.g., as described below with reference to FIG. 4A) on different layers (in a double-sided configuration), or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 132 can be based on mutual capacitance and/or self-capacitance. The electrodes can be arranged as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

In some examples, touch screens 124, 126, 128, 130, and 132 can sense a stylus. The stylus can produce a stylus signal that can capacitively couple to the touch electrodes of touch screen 124, 126, 128, 130, and 132 to be sensed by sense circuitry coupled to the touch electrodes. For example, the stylus can include a non-linear component that causes the stylus to produce a signal including harmonics of the frequency components of a drive signal produced by the touch screen. In some examples, a touch screen including touch node electrodes 408 can determine the location of the stylus by determining which touch node electrodes 408 detect the stylus signal. In some examples, a touch screen including row electrodes 404 and column electrodes 406 can determine the location of the stylus along the rows and along the columns to determine the location of the stylus on the touch screen. Touch screens can be configured to detect both passive conductive objects (e.g., fingers, passive styluses) and styluses. For example, the electronic device can perform a mutual or self capacitance scan to detect the conductive objects (e.g., perform a "touch scan") and perform stylus scans to detect the active stylus.

Figure 2:
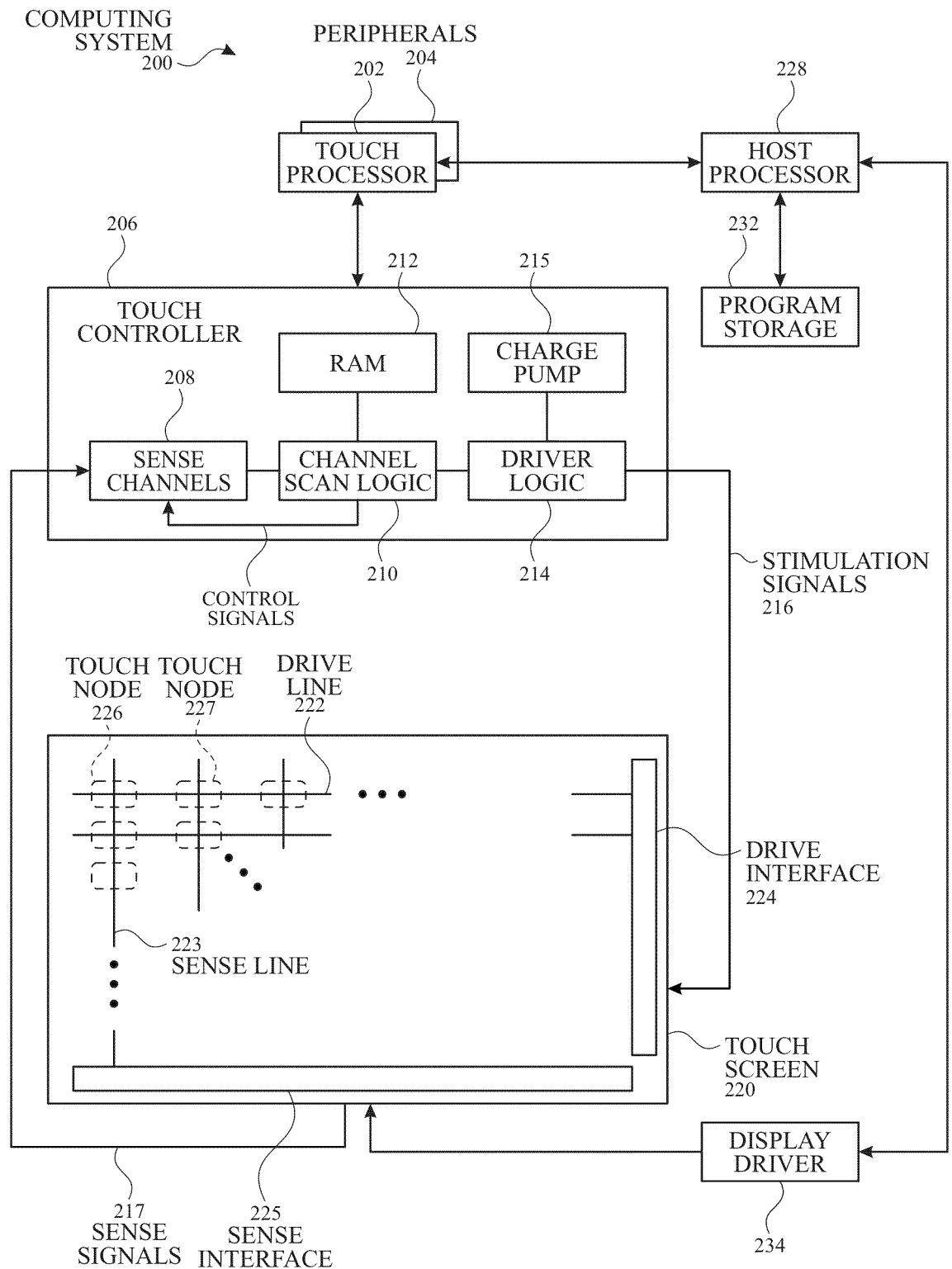
FIG. 2 illustrates an example computing system including a touch screen that can be implemented with noise mitigation techniques according to examples of the disclosure.

FIG. 2 illustrates an example computing system including a touch screen that can use noise mitigation techniques according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 (e.g., including one or more of sensing circuit 314), channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220 (e.g., to drive line 322 or touch node electrode 302 directly or via touch sensing circuit 314), as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may be described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including noise mitigation techniques, can be performed by firmware stored in memory (e.g., one of the peripherals 204 in FIG. 2) and executed by touch processor 202 and/or touch controller 206, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive touch nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
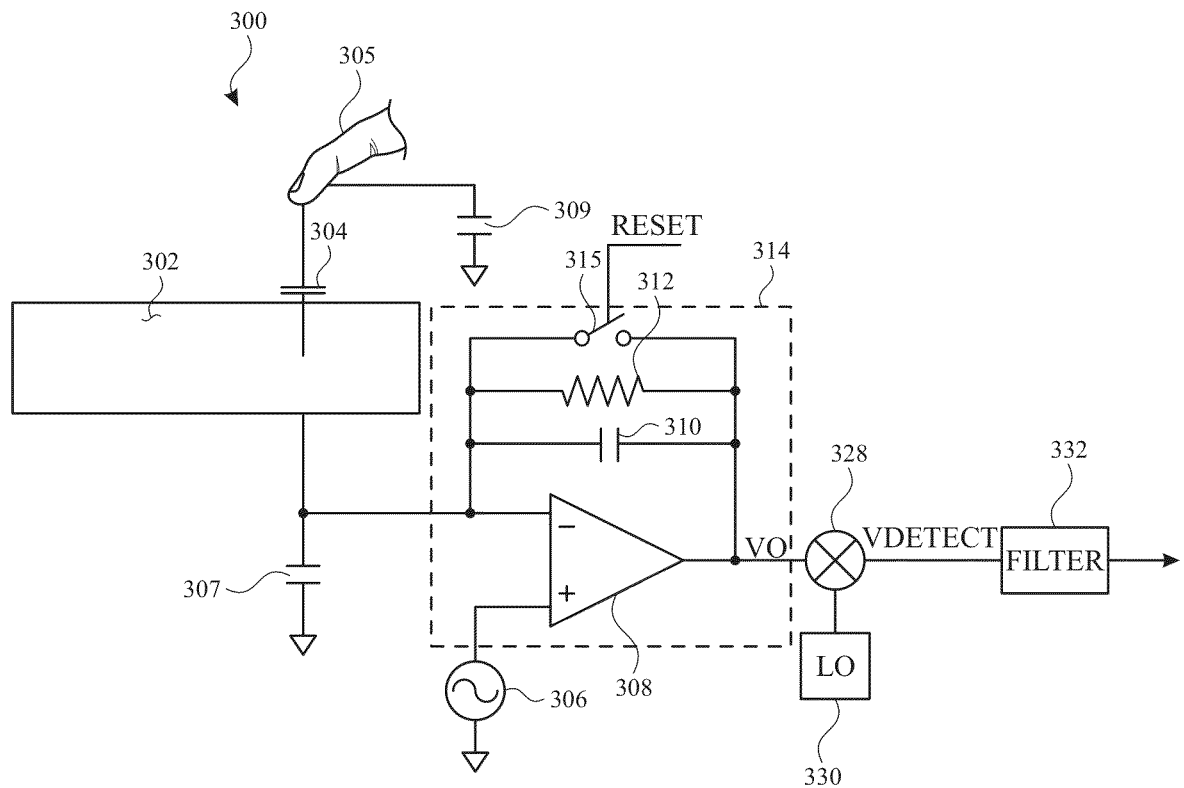
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch node electrode 302 and sensing circuit 314 (e.g., implemented in the one or more sense channels 208) according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object 305, such as a finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
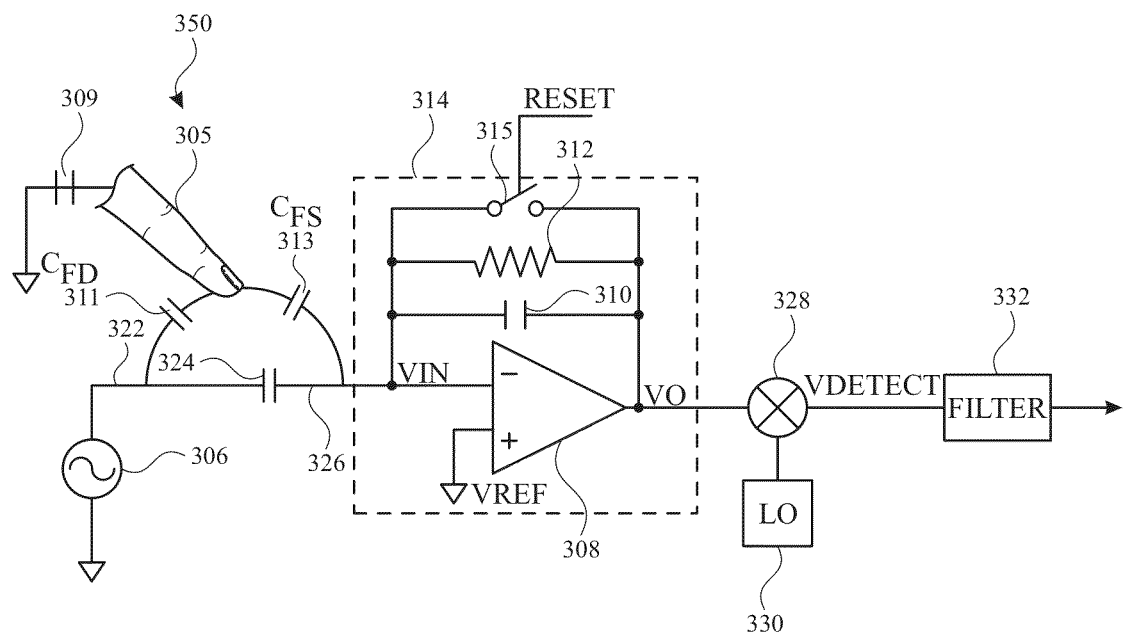
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., implemented in the one or more sense channels 208) according to examples of the disclosure. Drive line 322 can be stimulated by AC voltage source 306 (e.g., with an AC voltage signal). AC voltage source 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as $V_{in}$) can be inputted into the inverting input of operational amplifier 308, and the non-inverting input of the operational amplifier can be coupled to a reference voltage $V_{ref}$. Operational amplifier 308 can drive its output to voltage $V_o$ to keep $V_{in}$ substantially equal to $V_{ref}$, and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all.

The direct current (DC) portion of $V_{detect}$ can be used to determine if a touch or proximity event has occurred. Note that while FIGS. 3A-3B indicate the demodulation at multiplier 328 occurs in the analog domain, output Vo may be digitized by an analog-to-digital converter (ADC), and multiplier 328, filter 332 and local oscillator 330 may be implemented in a digital fashion (e.g., 328 can be a digital demodulator, 332 can be a digital filter, and 330 can be a digital NCO (Numerical Controlled Oscillator).

In some examples, a stylus signal can be detected using touch sensor circuit 350 or similar circuitry. For example, drive circuitry can provide a stimulation signal (e.g., via AC voltage source 306) to drive lines 322 that can capacitively couple to the stylus and the stylus can provide a stylus signal that capacitively couples to sense line 326. For example, the stylus signal can include harmonics of the stimulation signal provided by the drive lines 322. The coupled signal can be sensed by sensing circuit 314. In some examples, row electrodes and column electrodes (drive lines and sense lines in the mutual capacitance touch sensing) can be coupled to sensing circuits and can be sensed to detect the stylus. In some examples, while the row electrodes are sensed, the column electrodes can be driven and while the column electrodes are driven, the row electrodes can be sensed while sensing for a stylus. For example, the electronic device can perform one or more scans to drive the column electrodes and sense the row electrodes during a first time and can then perform one or more scans to drive the row electrodes and sense the column electrodes during a second time. In some examples, a touch screen 402 including touch node electrodes 408 can sense an active stylus in a similar manner (e.g., each can be coupled to a sensing circuit 314). Additional examples of sensing a stylus are described below with reference to FIGS. 7A-7F.

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
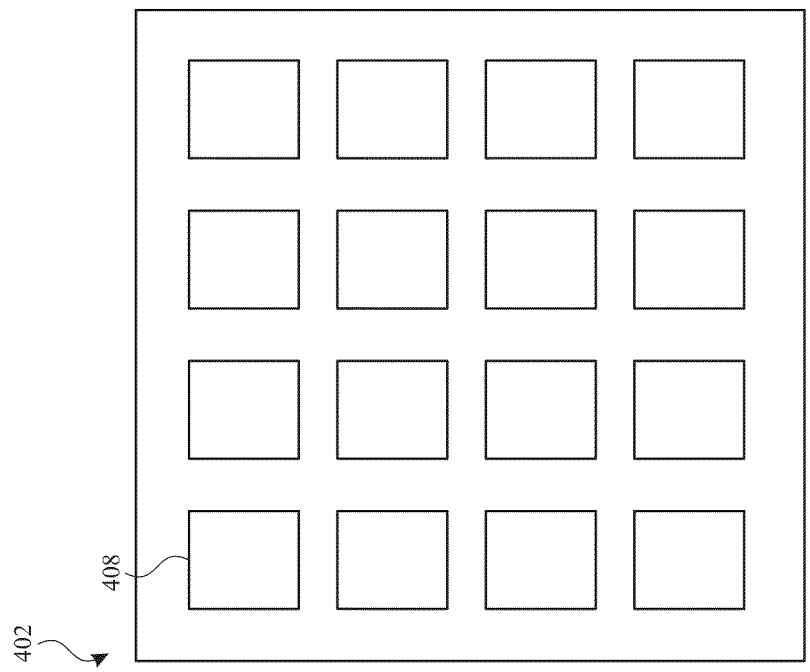
FIG. 4B illustrates touch screen with touch node electrodes arranged in a pixelated touch node electrode configuration according to examples of the disclosure.
Figure 4A:
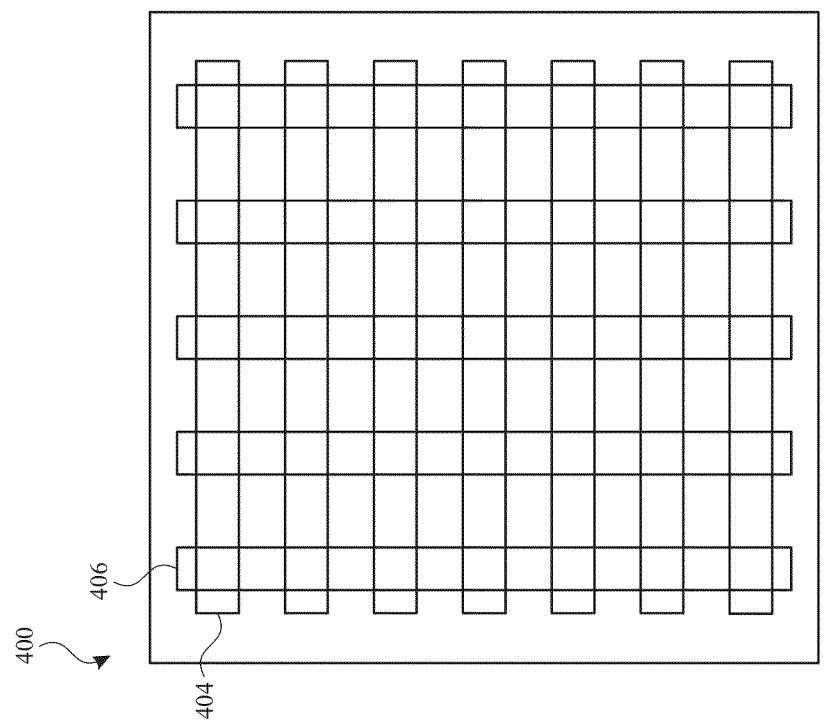
FIG. 4A illustrates touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400. In some examples, touch screen 400 can sense a stylus signal provided by an active stylus using touch electrodes 404 and 406.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 402. In some examples, touch screen 402 can sense the self-capacitance of touch node electrodes 408 to detect touch and/or proximity activity on touch screen 402, and in some examples, touch screen 402 can sense the mutual capacitance between touch node electrodes 408 to detect touch and/or proximity activity on touch screen 402. In some examples, touch screen 402 can use touch electrodes 408 to sense an active stylus.

Figure 5:
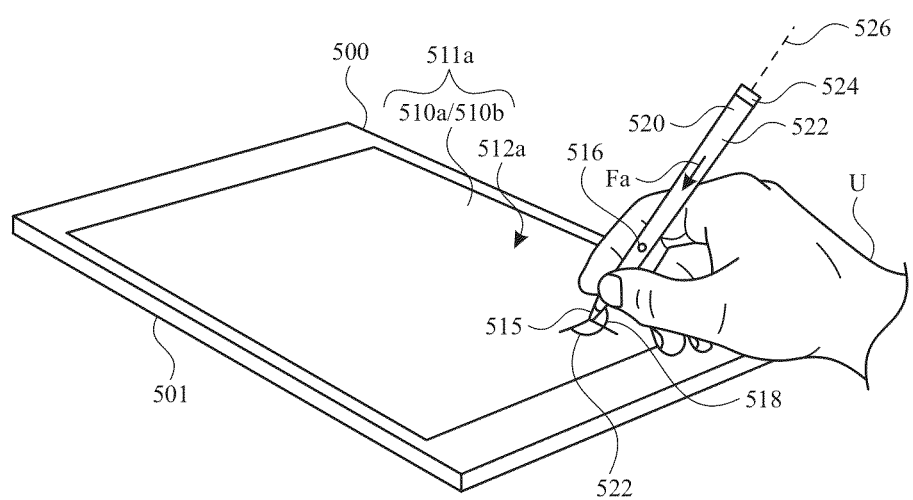
FIG. 5 illustrates an exemplary stylus and exemplary electronic device according to some examples of the disclosure.

FIG. 5 illustrates an exemplary system including a stylus 520 and an electronic device 500 according to some examples of the disclosure. Stylus 520 (e.g., a marking tool, smart pen, smart brush, wand, chisel, user-manipulated electronic input device, hand-held input device, and the like, or any other suitable accessory, such as a glove) may be configured to provide input to electronic device 500 (e.g., a tablet computer, laptop computer, desktop computer, and the like). A user may manipulate the orientation and position of stylus 520 relative to a surface of the touch-sensitive display of electronic device 500 to convey information to electronic device 500, such as, but not limited to, writing, sketching, scrolling, gaming, selecting user interface elements, moving user interface elements, and so on. In some examples, the surface of the touch-sensitive display of electronic device 500 may be a multi-touch display screen. However, in some examples, the surface of the touch-sensitive display of electronic device 500 may be a non-display surface of the touch-sensitive display, such as, but not limited to, a trackpad or drawing tablet. The surface of the touch-sensitive display may be a foldable or flexible surface or display. Electronic device 500 may be used to capture free-form user input from stylus 520. For example, the user can slide, move, draw, or drag a tip of stylus 520 across the surface of the touch-sensitive display of electronic device 500, which, in response, may render a graphical object (e.g., a line) using a display positioned below the surface of the touch-sensitive display. In such an example, the rendered graphical object may follow or otherwise correspond to the path of stylus 520 across the surface of the touch-sensitive display of electronic device 500. The thickness and/or shape and/or intensity and/or any other suitable rendered characteristic of the rendered graphical object may vary based, at least in part, on one, some, or each of various characteristics, including, but not limited to, a force or speed with which the user moves stylus 520 across the surface of the touch-sensitive display, an angle of stylus 520 relative to the surface of the touch-sensitive display (e.g., the inclination of stylus 520 relative to a plane of the surface of the touch-sensitive display, a writing angle of stylus 520 relative to a horizontal writing line traversing the surface of the touch-sensitive display, etc.), a variable setting of a variable input component of stylus 520, which one of multiple tips of stylus 520 is interacting with the surface of the touch-sensitive display, a variable setting of an application running on electronic device 500 (e.g., a virtual drawing space application), and/or a combination thereof.

Broadly and generally, electronic device 500 may be operative to determine and/or estimate one or more outputs of stylus 520 (and/or changes therein over time as a scalar or vector quantity), to interpret the user's manipulation thereof as input to electronic device 500. For example, electronic device 500 may be operative to estimate: the magnitude of force applied by a user's grip to stylus 520 (e.g., non-binary estimate of magnitude as a scalar or vector quantity); a magnitude (e.g., non-binary estimate of magnitude as a scalar or vector quantity) of force applied (e.g., force applied Fa) by stylus 520 to the surface of the touch-sensitive display of electronic device 500; the location at which the area over which stylus 520 may touch or nearly touch the surface of the touch-sensitive display of electronic device 500; a polar angle of stylus 520 relative to a plane of the surface of the touch-sensitive display (e.g., inclination of stylus 520 (e.g., a polar angle 518 (e.g., as may be defined between a vector normal to the plane of surface of the touch-sensitive display of device I/O interface 511*a* and a longitudinal axis 526 of stylus 520, such as a zenith))); an azimuthal angle of stylus 520 relative to an axis of the surface of the touch-sensitive display (e.g., an azimuthal angle (e.g., as may be defined between the polar angle 518 and a reference vector within the plane of surface of the touch-sensitive display 510*a*, such as an axis of electronic device 500)); a vector or scalar representation of the angular position of stylus 520 relative to a plane of the surface of the touch-sensitive display; three-dimensional coordinates (e.g., spherical, Cartesian, and so on) of one or more points along the length of stylus 520 relative to the surface of the touch-sensitive display; and so on. In some examples, electronic device 500 may be operative to monitor such variables over time to estimate rates of change therein as either scalar or vector quantities (e.g., velocity, acceleration, and so on). The operation of estimating or determining two-dimensional position coordinates of stylus 520 as a point (or area) within or parallel to a plane of the surface of the touch-sensitive display, whether such operation is performed by electronic device 500, performed by stylus 520, and/or performed, at least in part, as a result of cooperation there between (or with one or more other electronic devices), is generally referred to herein as "locating" the stylus.

Electronic device 500 and/or stylus 520 can be configured to estimate and/or monitor the location of stylus 520 over time and compute differential or integral quantities such as, but not limited to, acceleration, velocity, total force applied, path length, and so on. For example, the operation of estimating the velocity and/or acceleration of stylus 520 relative to the surface of the touch-sensitive display as stylus 520 is moved across that surface, whether such operation is performed by electronic device 500, performed by stylus 520, and/or performed, at least in part, as a result of cooperation therebetween (or with one or more other electronic devices), is generally referred to herein as estimating the "planar motion" of the stylus. The operation of estimating the angular velocity and/or acceleration of stylus 520 relative to a plane of the surface of the touch-sensitive display as it is moved thereacross, whether performed by electronic device 500, performed by stylus 520, and/or performed, at least in part, as a result of cooperation therebetween (or with one or more other electronic devices), is generally referred to herein as estimating the "angular motion" of the stylus.

Electronic device 500 may be any portable, mobile, or hand-held electronic device configured to interact with stylus 520 for changing any suitable characteristic(s) of device 500 (e.g., any suitable graphical object input tool characteristics that may be utilized to render a graphical object) in response to manipulation of stylus 520 across a surface of the touch-sensitive display of electronic device 500. Alternatively, electronic device 500 may not be portable at all, but may instead be generally stationary. Electronic device 500 can include, but is not limited to, a media player, video player, still image player, game player, other media player, music recorder, movie or video camera or recorder, still camera, other media recorder, radio, medical equipment, domestic appliance, transportation vehicle instrument, musical instrument, calculator, cellular telephone, other wireless communication device, personal digital assistant, remote control, pager, computer (e.g., a desktop, laptop, tablet, server, etc.), merchant accessory (e.g., signature pad (e.g., as may be used in a check-out line of a merchant store during payment processing)), monitor, television, stereo equipment, set up box, set-top box, wearable device (e.g., watch, clothing, etc.), boom box, modem, router, printer, and combinations thereof. Electronic device 500 may include one or more components described above with reference to FIG. 2 (e.g., electronic device 500 can be the same as electronic device 200).

Returning to FIG. 5, the user U manipulates the orientation and position of stylus 520 relative to surface of the touch-sensitive display input component 510*a* (e.g., a particular input component 510) of electronic device 500 in order to convey information to electronic device 500. Electronic device 500 may be configured to perform or coordinate multiple operations such as, but not limited to, locating stylus 520, estimating the angular position of stylus 520, estimating the magnitude of force by stylus 520 to surface of the touch-sensitive display 510*a*, determining a variable setting of a variable input component of stylus 520, determining a variable setting of an application running on electronic device 500 (e.g., a virtual drawing space application), and/or a combination thereof. The electronic device 500 can perform these and other operations at the same time or at different times. In one non-limiting example, the operation of determining the location of stylus 520 can be performed simultaneously with the operation of determining the angular position of stylus 520, while the operation of estimating the magnitude of force by stylus 520 to surface of the touch-sensitive display 510*a* may be performed periodically and/or based on whether electronic device 500 is configured to accept force input from stylus 520 given a particular operational mode of electronic device 500 (or of stylus 520) at a particular time.

FIG. 5 illustrates an exemplary stylus 520 and exemplary electronic device 500 according to some examples of the disclosure. The user U can grip a barrel or handle or body 522 of stylus 520 extending between a front tip 515 of stylus 520 and a rear tip portion 524 of stylus 520. User U may interact with the electronic device 500 by sliding a tip portion, such as tip portion 515, of stylus 520 across surface of the touch-sensitive display 510*a* of electronic device 500. As shown in FIG. 5, for example, device 500 can be a tablet computing device. It should be understood that many other electronic devices (with or without displays positioned below a stylus surface of the touch-sensitive display), such as any of the electronic device described above with reference to FIGS. 1A-1E, can be used to detect stylus 520. For example, the electronic device can be implemented as a peripheral input device, a trackpad, a drawing tablet, and the like.

In some examples, stylus 520 may have a general form of a writing instrument, such as a pen or a pencil-like structure with a cylindrical body 522 with two ends, such as a first end terminated at tip 515 and a second end terminated at rear portion 524. One or more of tip 515 and rear portion 524 can be removable, affixed to body 522, or an integral part of body 522. In some examples, other input devices with different form factors are possible.

The stylus 520 can include one or more input or output components, which can be located at one or more of portions 515-524 of stylus 520. These components can include a button, a dial, a slide, a force pad, a touch pad, audio component, haptic component, and the like, may at least partially reside. As one example, at least a portion of a simple mechanical switch or button input component that may be manipulated by user U for adjusting a variable setting of stylus 520 can be located at aperture 516. In some examples, stylus 520 can operate in a first mode when such an input component is manipulated in a first way and in a second mode when such an input component is manipulated in a second way.

Rear portion 524 of stylus 520 may provide a cosmetic end to body 522. Rear portion 524 may be formed integrally with body 522. In some examples, rear portion 524 may be formed similarly to tip 515. For example, rear portion 524 may provide another tip feature for interacting with a surface of the touch-sensitive display of device 500 (e.g., stylus 520 may be flipped over by user U to drag rear portion 524 across surface of the touch-sensitive display input component 510a of electronic device 500 rather than to drag tip 515 across surface of the touch-sensitive display input component 510a of electronic device 500, which may enable different interactions with device 500). In some examples, rear portion 524 may include a switch or button or any other input component that may be manipulated by user U for adjusting a setting of stylus 520.

Tip 515 of stylus 520 may be configured to contact or nearly contact surface of the touch-sensitive display 510a of device 500, allowing the user U to use the stylus 520 to interact with the device 500. In some examples, tip 515 can include a tapered end or point, similar to a pen, which can enable the user U to more precisely control stylus 520 and provide a familiar form factor. In some examples, tip 515 may be blunt or rounded, may take the form of a rotatable or fixed ball, or may have another shape. Tip 515 can include a material that can be softer than a material of the surface of the touch-sensitive display 510a. For example, tip 515 can include a silicone, a rubber, a fluoro-elastomer, a plastic, a nylon, conductive or dielectric foam, a brass or metal ball with a polymer coating or dielectric coating (e.g., a thin coating with a high dielectric constant) or any other suitable coating, or any other suitable material or combination of materials. In some examples, tip 515 not cause damage to surface of the touch-sensitive display 510a or layers applied to surface of the touch-sensitive display 510a when the stylus 520 is in use.

In some examples, device 500 can include a sensor layer 510b. The sensor layer 510b can be positioned below or integrated with surface of the touch-sensitive display 510a and/or display 512a. The device 500 may use the sensor layer to detect proximate objects, including detecting the presence and/or location of stylus 520 on surface of the touch-sensitive display 510a. In other examples, device 500 may use sensor layer 510b to detect the presence of another object on surface of the touch-sensitive display 510a, such as a finger of the user U. In still further examples, device 500 may use sensor layer 510b to detect the force with which an object, such as stylus 520 or other object, presses on surface of the touch-sensitive display 510a. In some examples, the sensor layer 510b (e.g., of surface of the touch-sensitive display input component 510a) can be optically transparent (e.g., in the case of a touch screen overlaid on or integrated with a display) or opaque (e.g., in the case of a trackpad or other opaque touch-sensitive surface). In some examples, surface of the touch-sensitive display 510a and/or sensor layer 510b may provide at least a portion of a foldable or flexible surface or display.

A stylus may or may not include a power supply (e.g., battery or wired powered supply), therefore, the stylus 520 may or may not be operative to generate any stylus electric field independently (e.g., without being stimulated by an external stimulus). Instead, a stylus may be provided with limited stylus I/O circuitry that may be operative to be stimulated by an external stimulus, such as a device stimulus that may be generated by device I/O circuitry of device I/O interface 511a of electronic device 500 and that may be operative to stimulate the stylus I/O circuitry when located proximate to device I/O interface 511a and/or by user U when holding stylus 520, whereby that stimulation of the stylus I/O circuitry may be operative to enable the stylus I/O circuitry to provide any suitable stylus electric field that may then be detected by device 500 for estimating the location of the stylus. Not only may such stylus I/O circuitry be configured to require no internal power supply for providing a unique stylus electric field, but also such stylus I/O circuitry, when stimulated, may be configured to provide a stylus electric field that may be distinguishable by device 500 from an electric field that may be provided by a user's direct contact with device I/O interface 511a.

Figure 6:
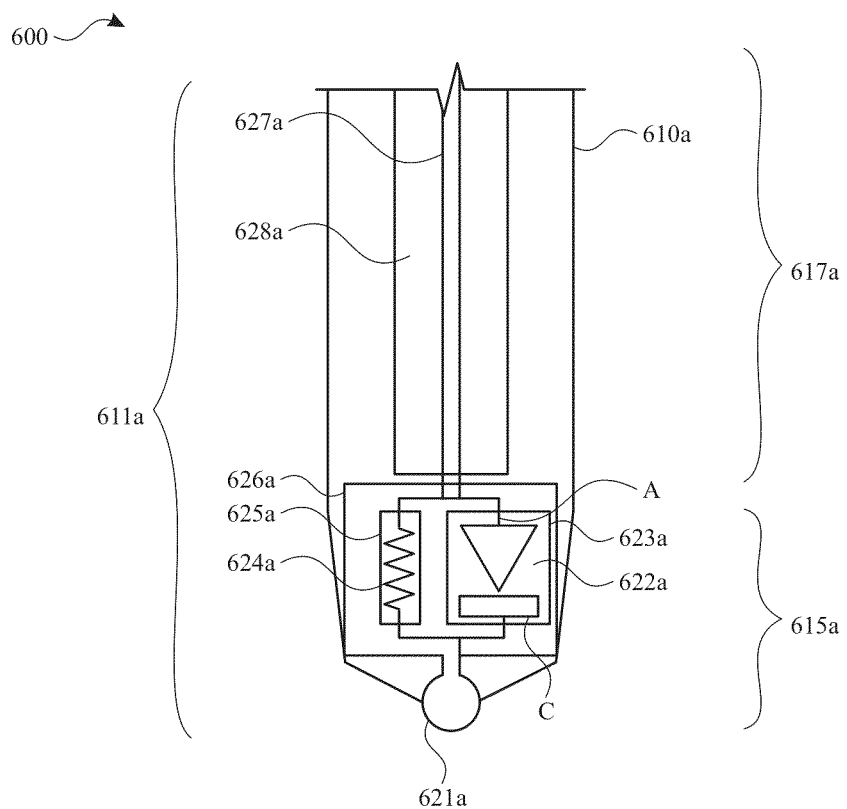
FIG. 6 illustrates an exemplary stylus according to some examples of the disclosure.

For example, FIG. 6 illustrates an exemplary stylus 600 according to some examples of the disclosure. In some examples, stylus 600 may include stylus I/O circuitry 611a. Stylus I/O circuitry 611a may operate in response to external stimulus, such as a drive signal generated by an electronic device (e.g., electronic device 136, 140, 144, 148, 150, 200, or 500). As shown by FIG. 6, for example, stylus 600 may include body portion 617a extending between a front tip portion 615a and a rear tip portion (not shown), where body portion 617a may be configured to be held by user U as the user uses stylus 600 to interact with an electronic device.

In some examples, body stylus circuitry 627a may be electrically coupled to front tip stylus circuitry 626a and/or to rear tip stylus circuitry (not shown). Body stylus circuitry 627a may be any suitable circuitry that may be operative to be electrically coupled (e.g., capacitively coupled) to user U when user U is holding stylus 600 about at least a portion of body portion 617a. As shown in FIG. 6, for example, body stylus circuitry 627a may include at least one conductive material extending along at least a portion of a length of body portion 617a of stylus 600, which may be insulated by any suitable insulation 628a. In some examples, body stylus circuitry 627a may include a conductive (e.g., copper) tape along a portion of body portion 617a, where such tape may be positioned under any suitable insulation, such as a finger pad of any suitable material. The stylus can include any suitable housing 610a, such as a plastic housing. In some examples, the housing 610a can include insulation 528a. In some examples, at least a portion of body stylus circuitry 627a may be at least partially exposed via housing 610a and/or insulation 628a, thereby enabling direct contact by user U.

In some examples, stylus I/O circuitry 611a can include a front tip interface component 621a that can be included in front tip portion 615a of the stylus 600. In some examples, front tip interface component 621a can include one or more of silicone, rubber, fluoro-elastomer, plastic, nylon, conductive or dielectric foam, metal (e.g., brass (e.g., a brass ball with a dielectric or polymer coating (e.g., a thin coating with a high dielectric constant))), or any other suitable material or combination of materials. Thus, in some examples, contact and movement of front tip interface component 621a across surface of the touch-sensitive display 510a of electronic device 500 may not damage surface of the touch-sensitive display 510a or layers applied to surface of the touch-sensitive display 510a. In some examples, front tip interface component 621a can be removably attached to body portion 617a, such as via threadings/screws, detents and/or recesses, interference-fit or snap-fit, and/or magnetic attraction, and/or the like.

Front tip stylus circuitry 626a may be positioned between and electrically coupled to front tip interface component 621a and body stylus circuitry 627a. Front tip stylus circuitry 626a can provide a non-linear load between body stylus circuitry 627a and front tip interface component 621a. In some examples, the front tip interface component 621a of stylus 600 may be stimulated by a signal that can be generated by device I/O circuitry of device I/O interface 511a of electronic device 500. For example, front tip stylus circuitry 626a may include any suitable non-linear electrical circuitry 623a that may be electrically coupled (e.g., in series) between front tip interface component 621a and body stylus circuitry 627a. For example, the non-linear circuitry 623a of stylus 600 can include at least one diode 622a. As shown in FIG. 6, an anode A of diode 622a may be electrically coupled to body stylus circuitry 627a and a cathode C of diode 622a may be electrically coupled to front tip interface component 621a. It should be understood, however, that it is possible to orient the diode 622a in the opposite way (e.g., connecting the anode A to the front tip interface component 621a). In some examples, the stylus 600 can include any suitable number (e.g., one or two or three or four or more) of diodes 622a. The diodes can be coupled together in series (e.g., a cathode of one diode may be coupled to an anode of a next diode and/or the like) or in parallel.

Device I/O circuitry of I/O interface 511a of an electronic device 500 may provide a drive signal that can stimulate front tip interface component 621a of stylus 600 when front tip interface component 621a of stylus 600 is proximate to or touching surface of the touch-sensitive display input component 510a of I/O interface 511a. In some examples, the drive signal can be capacitively coupled to the front tip interface component 621a of the stylus 600. A non-linear response of the stylus 600 can be transmitted via the front tip interface component 621a to one or more sense electrodes of the electronic device 500, enabling the electronic device 500 to detect and locate the stylus 600, as will be described in more detail below with reference to FIGS. 7A-7F.

Moreover, in some examples, non-linear electrical circuitry 623a that may be electrically coupled to front tip interface component 621a may enable stylus 600 to be identified and distinguished from nearby user touches, dragging fingers, palm rests, and/or the like, due to a non-linear load that may generate a non-linear distortion or harmonics (e.g., a second harmonic) at touch pixels near the stylus tip.

In some examples, diode 622a may be provided with any suitable characteristics that enable the electronic device 500 to detect stylus 600. For example, diode 622a can have a low capacitance (e.g., low parasitic capacitance), low reverse leakage, and/or low turn on voltage diode. The junction capacitance of such a diode may be configured to be low (e.g., less than 1.0 picofarad and/or less than 50 femtofarads). A reverse leakage current of such a diode may be controlled to be not too high. A Schottky diode, two or more Schottky diodes in series, or a specifically designed diode may be used.

In some examples, as shown, circuitry 626a may also include (e.g., in parallel with non-linear electrical circuitry 623a) any suitable resistance circuitry 625a (e.g., at least one resistor 624a). Resistor 624a can control reverse leakage current of non-linear electrical circuitry 623a and/or prevent direct current ("DC") positive voltage build up at the diode by, for example, draining off any DC while maintaining non-linearity of circuitry 626a. The resistance of resistor 624a may be selected in any suitable manner, such as by using a model of the panel, including its stimulation voltage and capacitance to the tip, and the non-linear device model, and optimizing the model. As an example, when using one or more Schottky diodes for non-linear electrical circuitry 623a, the resistance of resistor 624a can be in the range of 4.0-6.0 megohms, or even no additional leakage may be needed.

In some examples, non-linear electrical circuitry 623a, may modulate and rectify a voltage on front tip interface component 621a and may provide a load (e.g., a capacitance of front tip interface component 621a (e.g., effectively)) and resistance circuitry 625a, such as resistor 624a, may be used to discharge the capacitance and/or to prevent capacitance from charging up. In some examples, a high performance and/or low capacitance and/or low voltage Schottky diode (e.g., on an insulating substrate) may be used. As another example, a diode may be made of any suitable material(s), including, but not limited to gallium arsenide and/or titanium nitride, which may have a large reverse leakage, but such leakage may be appropriately managed by resistance circuitry 625a. In some embodiments, a diode can be configured to have a current-voltage characteristic (e.g., an I-V curve) with certain properties, including, but not limited to, one with an abrupt or substantially abrupt non-linearity at a predetermined voltage and one that may maintain that voltage by balancing the forward and reverse characteristics. To produce a predetermined reverse voltage, the diode may be configured with an I-V curve where current may be sufficient to leak out the current pushed into the diode on the forward voltage and/or to keep an operating point in a region that is non-linear. In some examples, the materials of the diode can be selected to achieve the desired performance characteristics. In some examples, a particular diode may be radiation damaged to cause the diode to leak during use in a stylus, which may obviate any need for resistance circuitry 625a. In some examples, the diode may be processed in a different manner(s), including, but not limited to, heat processing or damaging and/or radiation processing or damaging in order to configure the diode to perform in an effective manner, such as to increase or change the reverse leakage of the diode (e.g., increase reverse leakage independently of a reverse voltage).

Resistance circuitry 625a may include one or more resistors or may not be provided at all (e.g., when a diode with effectively increased reverse leakage is utilized). As another example, resistance circuitry may include or be provided by any suitable current limiting device and/or constant current source. For example, a field-effect transistor ("FET") (e.g., an n-type metal-oxide-semiconductor ("NMOS") device or depletion mode device) can be used. In some examples, such a device may not to have a gate, but may include SiO2 or any other suitable element above a dope channel (e.g., a slightly n-type element), for example, such that the total amount of current that flows therethrough may be about 1 microAmpere. This may create a flat region, such that when the circuitry receives a high voltage, the channel may disappear. Therefore, in some embodiments, tip stylus circuitry, such as tip stylus circuitry 626a, may be fabricated as a single chip (e.g., through very-large-scale integration ("VLSI")) that can include a diode (e.g., Schottky diode) and a current limiting PET (e.g., a diode connected depletion mode device (e.g., a device with a gate connected to the drain of the MOSFET), where a diode connected FET may provide the diode action as well as the constant current backward leakage of the tip stylus circuitry).

Therefore, stylus 600 may be configured to operate as a passive or semi-passive, non-linear stylus. A semi-passive stylus may be a stylus without an active transmitter, such as a stylus that may be configured to react to the incident field but that may not be a simple linear probe like a user's finger or a conductive rod. Stylus 600 may be fabricated at a very low cost, as it may not require any internal power supply and may not require any direct coupling or communication of any wired/wireless communication interface with device 500. Stylus 600 can have an advantage over a passive stylus on a projected capacitance input device by being able to be distinguished from direct user touch events (e.g., unintentional user touch events). Non-linearity of stylus 600 may double (or otherwise provide any suitable multiple of) a modulation frequency (e.g., a fundamental frequency) of a transmitted signal TS (e.g., from 200 kHz to 400 kHz (see, e.g., FIG. 7D, from a first harmonic 771 to a second harmonic 773)) such that many cycles of non-linearity may be detected, such that noise may be reduced by requiring detection of a harmonic multiple times within multiple cycles or just once in a single cycle.

Figure 7A:
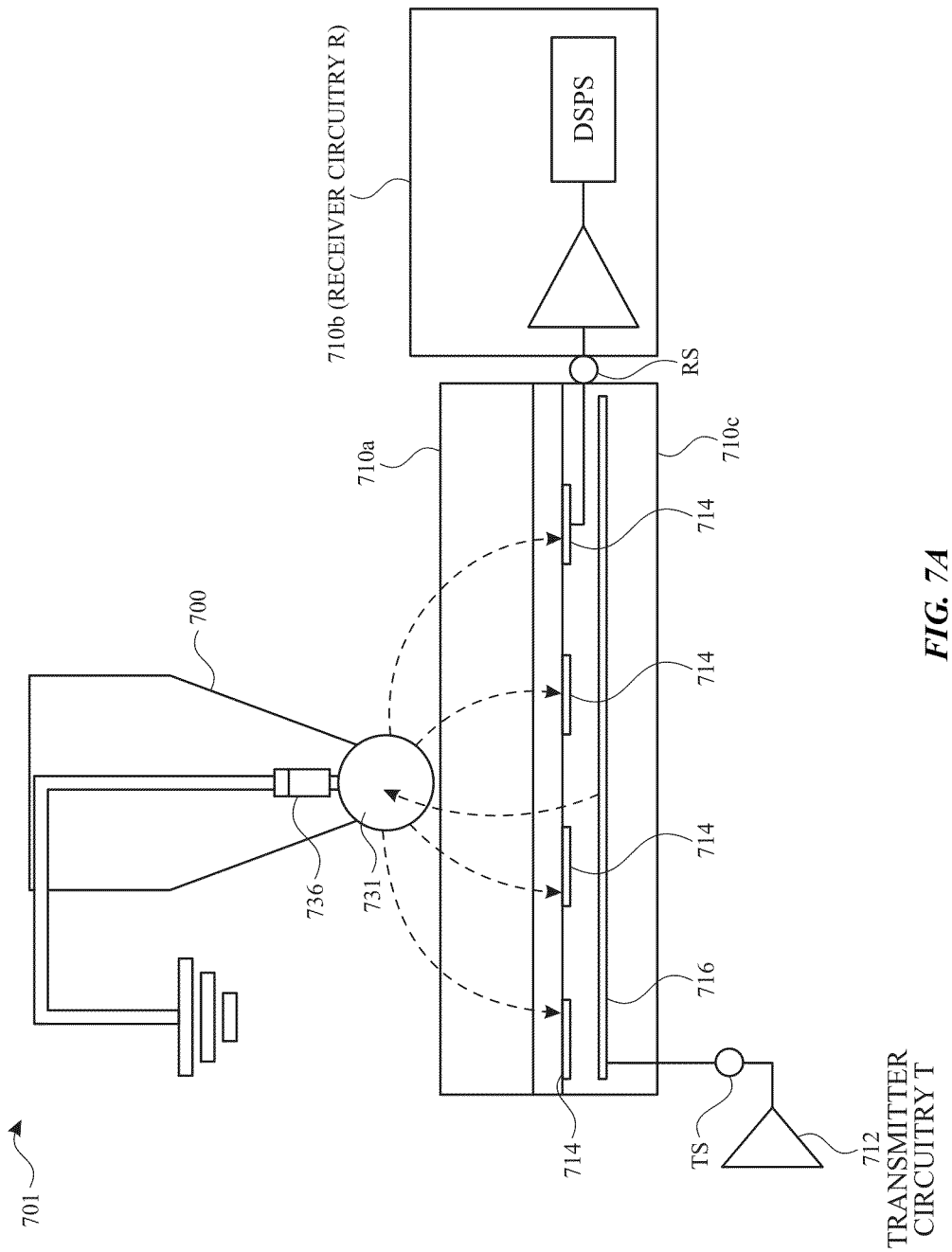
FIG. 7A illustrates detection of an exemplary stylus by an exemplary electronic device according to some examples of the disclosure.

FIG. 7A illustrates detection of an exemplary stylus 700 by an exemplary electronic device according to some examples of the disclosure. As mentioned, and as further shown in FIG. 7A, sensor layer 710a of electronic device (e.g., electronic device 136, 140, 144, 148, 150, 200, 500) can include matrix or array or grid of any suitable number of column electrodes 716 and any suitable number of row electrodes 714, any two of which may intersect to provide a touch node. Column electrodes 716 may also be referred to herein as transmit electrodes, while row electrodes 714 may also be referred to herein as receive electrodes. In some examples, however, both the rows 714 and the columns 716 are able to function as both transmit electrodes and receive electrodes in a time-multiplexed manner. In some examples, the electrodes can include an optically transparent conductive material, such as, but not limited to, metal oxides such as indium-tin oxide and antimony-tin oxide, nanowire patterns formed from silver nanowire, carbon nanotubes, platinum nanowire, gold nanowire, and so on, thin deposits of metal, and the like.

Any suitable electrical signal (e.g., transmit signal) TS, such as any suitable voltage waveforms (e.g., sinusoidal drive or trapezoidal voltages), may be emitted or transmitted on one, some, or each transmit electrode by any suitable transmitter circuitry T of I/O interface (e.g., of sensor layer 710a). Such a transmit signal TS may drive non-linear circuitry of a stylus (e.g., circuitry 736 of stylus 700) that may be positioned on or near the surface of the touch-sensitive display, and such non-linearity may produce harmonics or any other suitable non-linear aspects of transmit signal TS. Any suitable electrical signal (e.g., receive signal) RS, such as any suitable sensed current (e.g., $I_{sense}$), may be detected by any suitable receiver circuitry R of I/O interface (e.g., of sensor layer 710a) that may be provided along each one of the receive electrodes or that may be shared and used serially with two or more receive electrodes. As shown, receiver circuitry R may be any suitable circuitry, such as any suitable operational amplifier circuitry (e.g., a current sense amplifier (e.g., with feedback)) and an analog-to-digital converter ("ADC") that may be operative to digitize a current or other signal that may be sensed on a receive electrode (e.g., receiver circuitry R may be operative to hold other electrodes at virtual ground and utilize a current to voltage amplifier and then digitize the voltage on the receive electrode). Then, any suitable digital signal processing ("DSP") may be provided by a processor of the electronic device and any suitable application running thereon in combination with the circuitry of I/O interface (e.g., circuitry T and circuitry R of sensor layer 710a) in order to extract any non-linear aspects of the receive signal RS with respect to the transmit signal TS (e.g., to demodulate the second harmonic of a sine wave) and then to estimate a position of the stylus or accessory tip with respect to the device (e.g., X-Y location along the surface of sensor layer 710a) based on the extracted non-linear aspects.

FIG. 7B illustrates an exemplary drive signal applied to a drive line of the touch-sensitive surface according to some examples of the disclosure. For example, graph 750 of FIG. 7B may be indicative of an exemplary plot over time of an exemplary drive signal, such as a voltage transmit signal TS that may be applied by circuitry T to a transmit electrode of sensor layer 710a of I/O interface of the electronic device.

FIG. 7C illustrates an exemplary signal generated at a stylus in response to a drive signal according to some examples of the disclosure. Graph 760 of FIG. 7C may be indicative of an exemplary plot over time of an exemplary tip voltage. For example, the tip voltage can be a voltage receive signal RS that may be sensed by circuitry R as provided on a receive electrode of sensor layer 710a of I/O interface 111a. Tip voltage can be applied to the touch-sensitive surface by a tip of a stylus (e.g., tip 431a of stylus 700 (e.g., with non-linear circuitry 736)) when the drive signal is applied to the stylus tip 731. In some examples, if no tip is present, then the transmit electrode may be just a pure capacitance, and the current sensed may be reactively related through the capacitance, and may be out of phase but still similar to the transmit signal (e.g., sinusoidal, not asymmetrically distorted).

FIG. 7D illustrates exemplary frequency content of a voltage signal at the tip of an exemplary stylus according to some examples of the disclosure. Graph 770 of FIG. 7D may be indicative of a plot of magnitude with respect to frequency of a voltage signal (e.g., voltage transmit signal TS of graph 750) as sensed by a receive electrode (e.g., voltage receive signal RS of graph 760), for example, as may be determined by one or more DSPs of the electronic device. For example, as shown, graph 770 may identify a fundamental frequency (e.g., first harmonic) 771 (e.g., at a frequency of 200 kHz (e.g., a fundamental frequency of transmit signal TS)) and a non-linear aspect (e.g., second harmonic) 773 (e.g., at a frequency of 400 kHz (e.g., a multiple of the fundamental frequency of transmit signal TS)). In some examples, the first harmonic 771 is the frequency of a sinusoidal drive signal applied to one or more drive electrodes of the touch-sensitive surface, such as the signal illustrated in graph 750 of FIG. 7B. As shown in FIG. 7D, the non-linearity of stylus 700 may double (or otherwise provide any suitable multiple of) a modulation frequency (e.g., a fundamental frequency) of a transmitted signal TS (e.g., from 200 kHz to 400 kHz (see, e.g., FIG. 7D, from a first harmonic 771 to a second harmonic 773)) such that many cycles of non-linearity may be detected, such that noise may be reduced by requiring detection of a harmonic or any other suitable non-linear aspect multiple times within multiple cycles or just once in a single cycle.

FIG. 7E illustrates an exemplary image of touch that includes a contact of the stylus and a contact of another object according to some examples of the disclosure. Depiction 780 of FIG. 7E may be indicative of any external element(s) (e.g., the finger, hand, or palm of a user or other conductive object) determined to be sensed on a surface of sensor layer 710a by detecting fundamental frequency or first harmonic information (e.g., information of first harmonic 771 of graph 770) for one or more receive electrodes of the system. The image of touch of depiction 780 can include a stylus tip by depiction portion 781 and a portion of a user's hand by depiction portion 783. By detecting touch using the first harmonic 771 content of one or more received signals, the electronic device detects not only the non-linear stylus, but also conductive components that generate a linear response to the drive voltage, such as a conductive object (e.g., the user's hand). In some examples, analysis of the second harmonic 773 component of the sensed signal can be used to detect the non-linear stylus only, as will now be described with reference to FIG. 7F.

FIG. 7F illustrates an exemplary image of touch that includes a contact of an exemplary stylus according to some examples of the disclosure. For example, image of touch 790 of FIG. 7F may be indicative of any external element(s) determined to be sensed on a surface of sensor layer 710a based on any non-linear aspect or multiple (e.g., second) harmonic information (e.g., information of second harmonic 773 of graph 770) for one or more receive electrodes of the system. For example, as shown in FIG. 7F, the image of touch 790 may be indicative of only a stylus tip by depiction portion 791 and not also a portion of a user's hand because the stylus can have a non-linear electrical component and the user's hand may not. This may create a unique identifier for a stylus with non-linear circuitry that may resolve certain location detection issues, such as disambiguation, merge, and negative pixel.

Therefore, one DSP per receive electrode demodulation path may include a filter that includes two-times the stimulation frequency (e.g., the frequency of the stimulation transmitted signal TS) in its passband in order to detect the location of a stylus with non-linear circuitry (e.g., circuitry providing a second harmonic). This technique may be used to identify the location of the stylus and without detecting objects (e.g., the user's hand) that may not provide any non-linearity. Therefore, a transmitted signal (e.g., stimulation voltage (e.g., a pure tone or only with odd harmonics)) may be provided on one or more transmit electrodes to drive non-linear circuitry of a stylus that may produce at a stylus tip harmonic(s) or any other suitable non-linear aspect(s) of the transmitted signal. For example, the stylus may cause asymmetrical distortion due to a non-linear load (e.g., rectifier (e.g., diode)). In some examples, the electronic device can detect the stylus signal on one or more receive electrodes and, through any suitable processing (e.g., DSP), identify harmonics or non-linearity to identify the stylus.

In some examples, the electronic device is subject to noise from one or more sources (e.g., from other circuitry of electronic device, from external electrical signals, etc.). Thus, in some examples, the electronic device can include additional circuitry that mitigates noise and/or receiver circuitry 710b can perform one or more additional operations to mitigate noise. As shown in FIG. 7B, in some examples, the drive signal is a sinusoid at a predetermined fundamental frequency. In some embodiments, however, noise in the system can cause the drive signal to include noise, such as noise at a second or other harmonic of the fundamental frequency. The electronic device can estimate the noise in the drive signal and use the estimated noise when processing the sensed signal to reduce or remove components in the sensed signal that were caused by noise in the drive signal. For example, the electronic device can estimate frequency content at the second harmonic of the fundamental frequency in the drive signal and subtract, from the sensed signal (e.g., shown in FIG. 7C), the portion of the signal at the second harmonic frequency that was provided by the drive signal itself to obtain a more accurate measurement of the signal at the second harmonic frequency that was provided by the stylus. Other types of noise removal techniques can be used to remove noise from the drive signal and sense signal before or after performing touch processing to determine the location of the stylus.

Thus, as described above with reference to FIGS. 7A-7F, the electronic device can use the non-linearity of the stylus to differentiate the stylus from other conductive objects that do not include non-linear components. In some examples, the signal sensed by the system can include content with the second harmonic frequency when the stylus is present. When the stylus is not present, the sensed signal can include the fundamental frequency without including the second and other higher-order harmonics, for example.

In some examples, the stylus can be used to simulate drawing and/or writing with a writing implement. The electronic device can detect the location of the stylus over time, for example, and use the detected locations of the stylus to render a drawing corresponding to movement of the stylus. In some examples, the locations of the stylus sensed over time while the user is drawing or writing with the stylus can be referred to as "points." In some situations, noise can be included in the stylus data due to a noisy environment (e.g., while the electronic device is plugged into a power outlet to charge its battery). Noise in the stylus data can cause the electronic device to fail to detect one or more points that should be included in the drawing or writing data because noisy points are skipped. In some situations, noise can cause the electronic device to skip one frame of stylus data, which can include two points. In some situations, it can be uncommon for more than one consecutive frame of stylus data to be skipped.

Figure 8A:
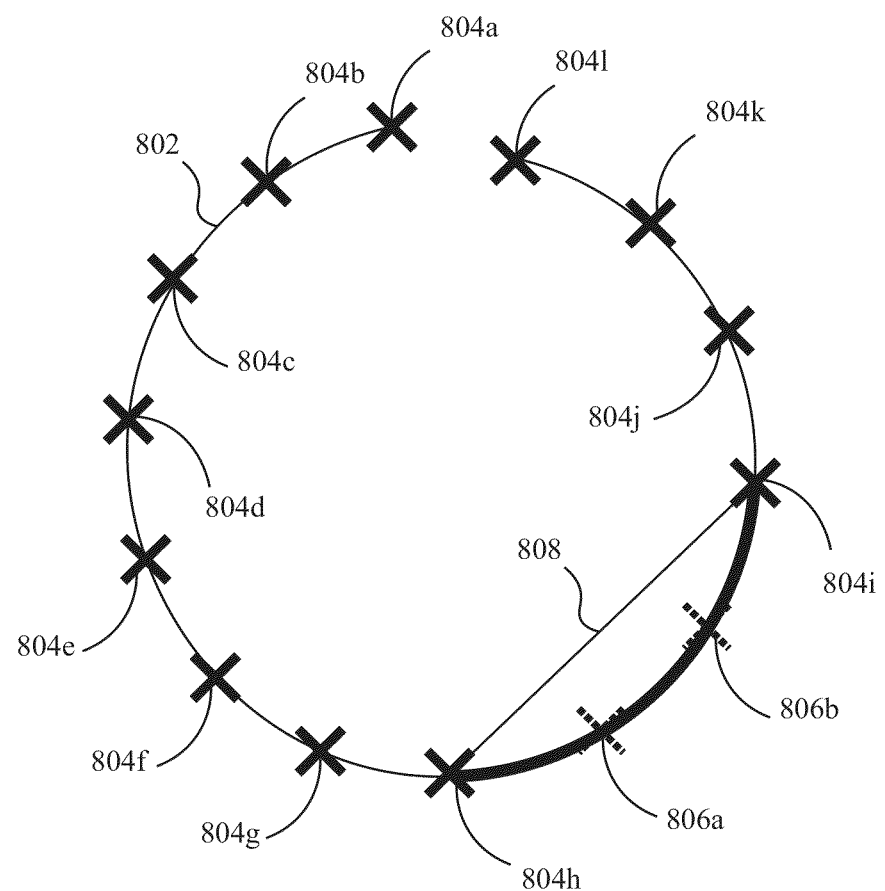
FIG. 8A illustrates an example drawing with noisy points skipped according to some examples of the disclosure.

FIG. 8A illustrates an example drawing with noisy points skipped according to some examples of the disclosure. FIG. 8A includes an example of a circle drawn by the user including noisy points 806a and 806b, which were not detected by the electronic device. For example, in FIG. 8A, the marking 802 corresponds to the actual stylus trajectory and points 804a through 804l, 806a and 806b show the sample points on that trajectory. For example, the points 804a through 804l are detected by the electronic device because points 804a through 804l have less noise than a predefined threshold and points 806a and 806b are not detected by the electronic device because these points 806a and 806b have more noise than the predefined threshold. In some examples, if the electronic device were to skip the points 806a and 806b without applying correction to the drawing, the portion of the trajectory that goes between points 806*a* and 806*b* would be replaced with line 808, which may not correspond to the drawing 802 or writing made by the user. In some situations, it can be advantageous to apply a correction to the writing or drawing data to produce drawings or writing that is closer to the path of the stylus made by the user than would be the case if noisy points 806*a* and 806*b* were skipped without making a correction.

In some examples, the correction can be made online (e.g., in real-time). For example, online correction can provide prediction of noisy points 806*a* and 806*b* to provide good immediate experience. In some examples, performing online correction includes detecting that a point needs to be corrected in real-time. In some examples, the electronic device corrects a point based on the sensed point being further from the last-sensed point by greater than a threshold distance. In some examples, the electronic device includes a sensor signal that determines, in real time, whether or not a sensed point is noisy (e.g., includes noise above a threshold amount). In some examples, online correction of a respective point is based on observations made prior to detecting the respective point, such as the location(s) and timing of one or more previously-sensed point(s) 804*a* through 804*g*. Examples of the disclosure include estimating stylus data based on an arbitrary number of points. For example, the electronic device can use a predetermined number or points, or can use a recurrent neural network to use all stylus data previously sensed in a predetermined time period of based on other predetermined conditions, such as using all stylus data sensed since the electronic device opened the user interface the user is currently using the stylus to interact with. In some examples, online correction does not use observations made after detecting the respective point (e.g., location(s) and timing of point(s) 804*i* through 804*l* sensed after the respective point). In some examples, the device performs pseudo-online correction based on previously-sensed points and a limited number of subsequently-sensed points that generates a delay between sensing and correcting the stylus data. For example, correction can be based on previously-sensed points and one point sensed after the noisy sample, which generates a delay of one sample. Other numbers of points sensed after the noisy point are possible, such as 2 or 3 points. In some examples, the electronic device uses neural networks, linear interpolation, and/or extrapolation to estimate the position of the stylus during noisy stylus data samples.

In some examples, the correction can be made offline. In some situations, infilling of noisy points 806*a* and 806*b* based on points sensed before and after the missing points can provide an improved drawing result, such as one or more of points 804*a* through 804*g* and one or more of points 804*i* through 804*l*. For example, offline corrections can be made to skipped or noisy points 806*a* and 806*b* after detecting one or more sensed (e.g., not noisy) points subsequent to the skipped or noisy points, such as one or more of points 804*i* through 804*l*. In some examples, the electronic device uses neural networks, linear interpolation, and/or extrapolation to estimate the position of the stylus during noisy stylus data samples.

In some examples, the electronic device uses a combination of online and offline correction. For example, the electronic device performs online correction while sensing stylus data then, once more data have been received after the noisy points, uses offline techniques to refine the estimated location of the noisy points. In some examples, after detecting the end of a drawing or writing stroke, the electronic device performs offline correction of points corrected online.

In some examples, the electronic device detects the end of the drawing or writing stroke based on not detecting further stylus data for a predetermined amount of time greater than several sample periods. Combining online and offline correction can be advantageous in that the user is able to view correction immediately based on online techniques and the correction may be more accurate once offline techniques are applied.

Figure 8B:
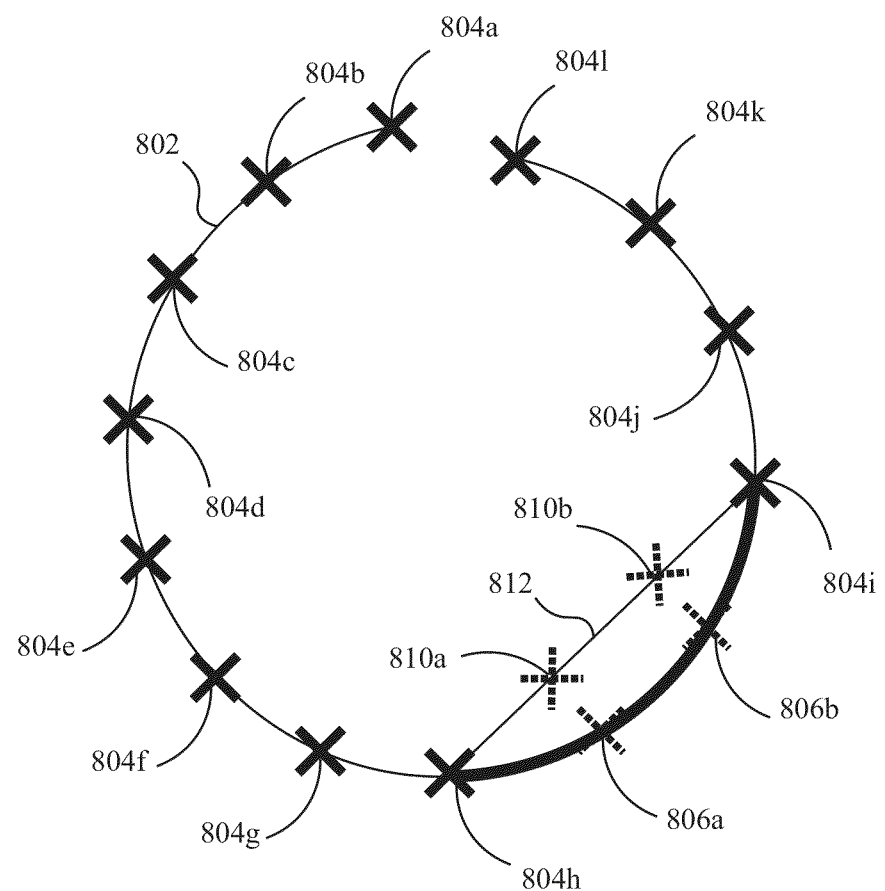
FIG. 8B illustrates an example of using linear interpolation to infill noisy points according to some examples of the disclosure.

FIG. 8B illustrates an example of using linear interpolation to infill noisy points 806*a* and 806*b* with predicted points 810*a* and 810*b* according to some examples of the disclosure. In some examples, linear interpolation corresponds to finding points 810*a* and 810*b* in a (e.g., straight or direct) line between one or more points 804*a* through 804*h* sensed before the noisy point(s) 806*a* and 806*b* and one or more points 804*i* through 804*l* sensed after the noisy point(s) 806*a* and 806*b*. For example, the electronic device infers the points 810*a* and 810*b* based on the points 804*h* and 804*i*. In this example, the resulting drawing includes the line 812 instead of the portion of marking 802 connected to the points 804*h* and 804*i*. In some examples, the electronic device performs linear interpolation offline. In some examples, the linear interpolation is based on points 804*h* and 804*i*, with or without being based on one or more of points 804*a* through 804*g* and 804*j* through 804*l*.

Figure 8C:
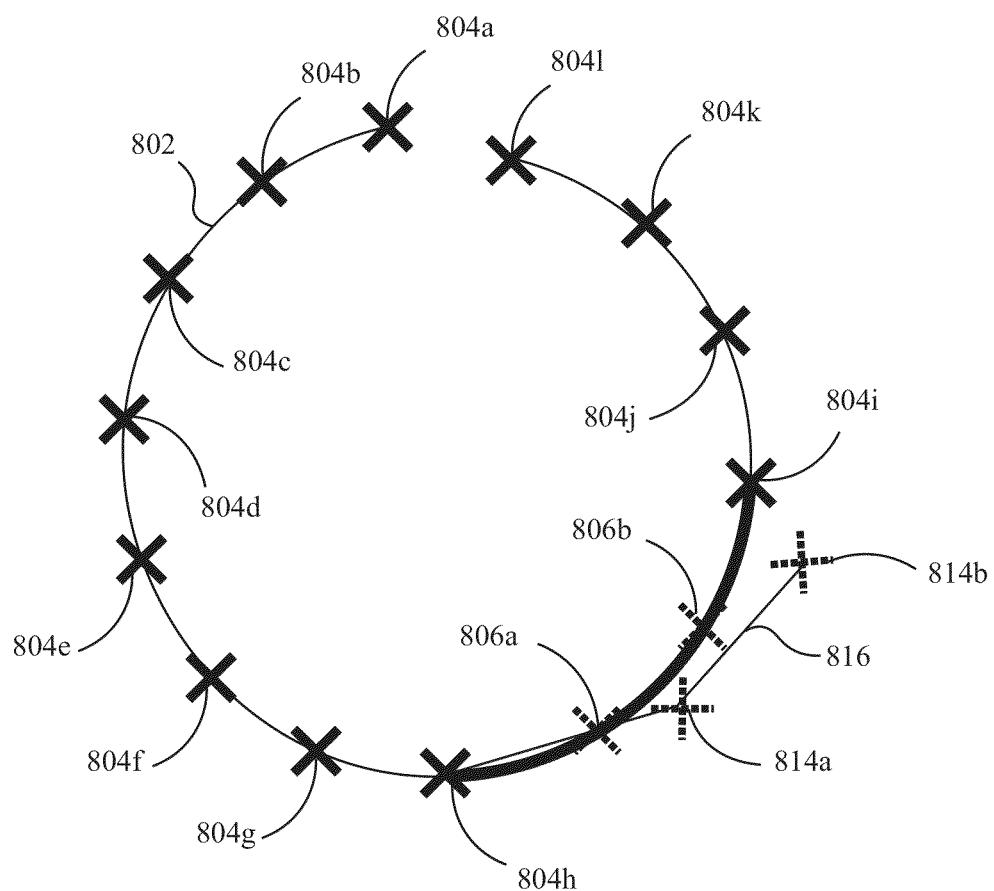
FIG. 8C illustrates an example of prediction for infilling according to some examples of the disclosure.

FIG. 8C illustrates an example of prediction for infilling according to some examples of the disclosure. In some examples, prediction can be performed online or offline. In some examples, the prediction method extrapolates previous movements into the future and could be used to predict points 814*a* and 814*b* from past observations, such as points 804*a* through 804*h*. For example, the electronic device infers points 814*a* and 814*b* shown in FIG. 8C from previously-sensed points 804*a* through 804*h* in FIG. 8C, resulting in the use of the line 816 in place of portions of the line 802 that include noisy points 806*a* and 806*b*. In some examples, the inferred points 814*a* and 814*b* are not based on points 804*i* through 804*l* sensed after sensing of the noisy points 814*a* and 814*b* is skipped. For example, the interpolated values of the points 814*a* and 814*b* are not based on the points 804*i* through 804*l*. In some examples, the interpolated values of the points 814*a* and 814*b* are based on one or more points 804*a* through 804*h* sensed before the noise occurred and the next point 804*i* sensed after the noise, but not subsequently sensed points 804*j* through 804 after point 804*i*. For example, the point 814*b* can be connected to the point 804*i*.

In some examples, the correction algorithm replaces noisy points 806*a* and 806*b* with predicted points 814*a* and 814*b*. In some examples, the correction algorithm replaces the noisy points 806*a* and 806*b* without adding additional points. In some examples, the algorithm detects that points 806*a* and 806*b* were skipped (e.g., due to noise) when the next point 804*i* is received after the skipped points 806*a* and 806*b*. In some examples, in response to sensing the next point 804*i* after skipping one or more points 806*a* and 806*b*, the electronic device computes an estimate of the original path 803 the user wrote and/or drew with the stylus. In some examples, the electronic device uses the estimate along the path that the user has been drawing. In some examples, the estimated points 814*a* and 814*b* can be inserted after the point 804*h* last detected before the skipped points 806*a* and 806*b*, which can lead to an increased perceived latency for the user. The electronic device can reduce the perceived latency as more points are received, such as one or more of points 804*i* through 804*l*.

For example, referring to FIG. 8C, in response to detecting the point 804i first detected after skipping points 806a and 806b, the electronic device can compute the time elapsed between detecting the last two points 804h and 804i. In some examples, in accordance with a determination that the time difference between the sensed points 804h and 804i exceeds a predefined threshold (e.g., a sensing period when no points are skipped), the electronic device can infill points 814a and 814b based on a plurality of recently-sensed points, such as one or more of points 804a through 804h. In some examples, the electronic device can determine, based on the time between the last sensed point 804h before one or more points 806a and 806b are skipped and the first point 804i sensed after the one or more points 806a and 806b were skipped, the number of points that were skipped. In some examples, the electronic device interpolates the same number of points 814a and 814b as the number of points 806a and 806b that were skipped. In some examples, the electronic device interpolates fewer points than the number of points that were skipped. In some examples, the electronic device interpolates a greater number of points than the number of points that were skipped.

For example, the electronic device estimates the true locations of the skipped points 806a and 806b based on the four points 804e through 804h most recently sensed. In some examples, the electronic device forgoes displaying portions of the drawing or writing corresponding to point 804h until the estimated points 814a and 814b are infilled. Thus, in some examples, there can be a delay in displaying the drawing or writing while points 814a and 814b are being infilled. In some examples, after infilling points 814a and 814b, the electronic device can render portions of the drawing 802 corresponding to subsequently-sensed points 804i through 804l at a faster rate to "catch up" to real time rendering of further drawings made by the user. In some examples, this approach can be performed online. In some examples, the electronic device can estimate points 814a through 814b in response to detecting levels of noise above a threshold amount as described herein.

In some examples, the electronic device can interpolate noisy points using polynomial interpolation, Bezier interpolation, and/or a neural network. An example interpolation or extrapolation approach includes estimating a functional approximation of a series of sensed points using a specific form. For example, in the case of a polynomial interpolation, the electronic device uses a polynomial equation based on the given points that are not noisy. Then, in some examples, the equation can be used to estimate corrected values for noisy points. As another example, in the case of Bezier interpolation, the electronic device uses the corresponding functional form to interpolate noisy points based on points that are not noisy. In some examples, the electronic device can estimate a continued trajectory of the stylus after the end of a sensed stroke. This approach can be helpful if the points at the end of the stroke are noisy. In some examples, neural networks can be used to develop a more complex functional form of the series of points. In some examples, the neural network can train the computation of parameters before use.

Figure 9A:
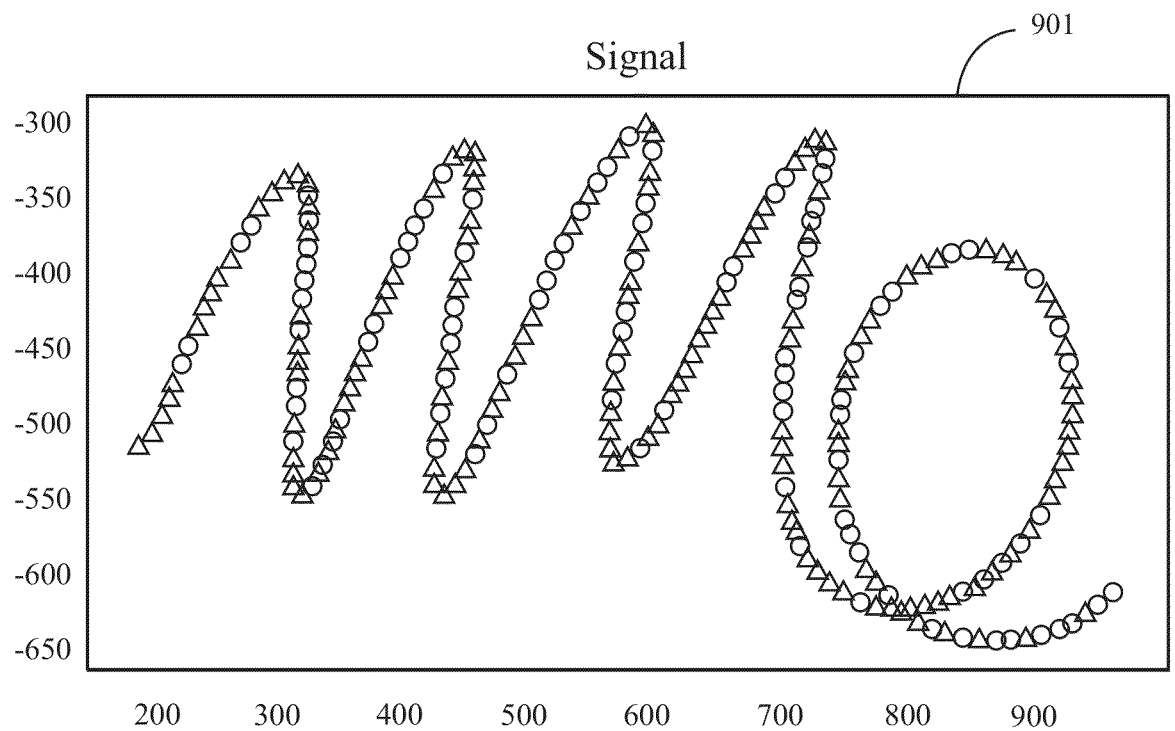
FIG. 9A illustrates an example of stylus data including sensed points and skipped points according to some examples of the disclosure.

FIG. 9A illustrates an example of stylus data including sensed points 904 and skipped points 902 according to some examples of the disclosure. In some examples, the skipped points 902 are noisy points that the electronic device was not able to sense. FIG. 9A illustrates the skipped points 902 at the true locations at which the stylus moved over, for example. In some examples, the stylus data sensed by the electronic device includes the sensed points 904 but does not include the skipped points 902.

Figure 9B:
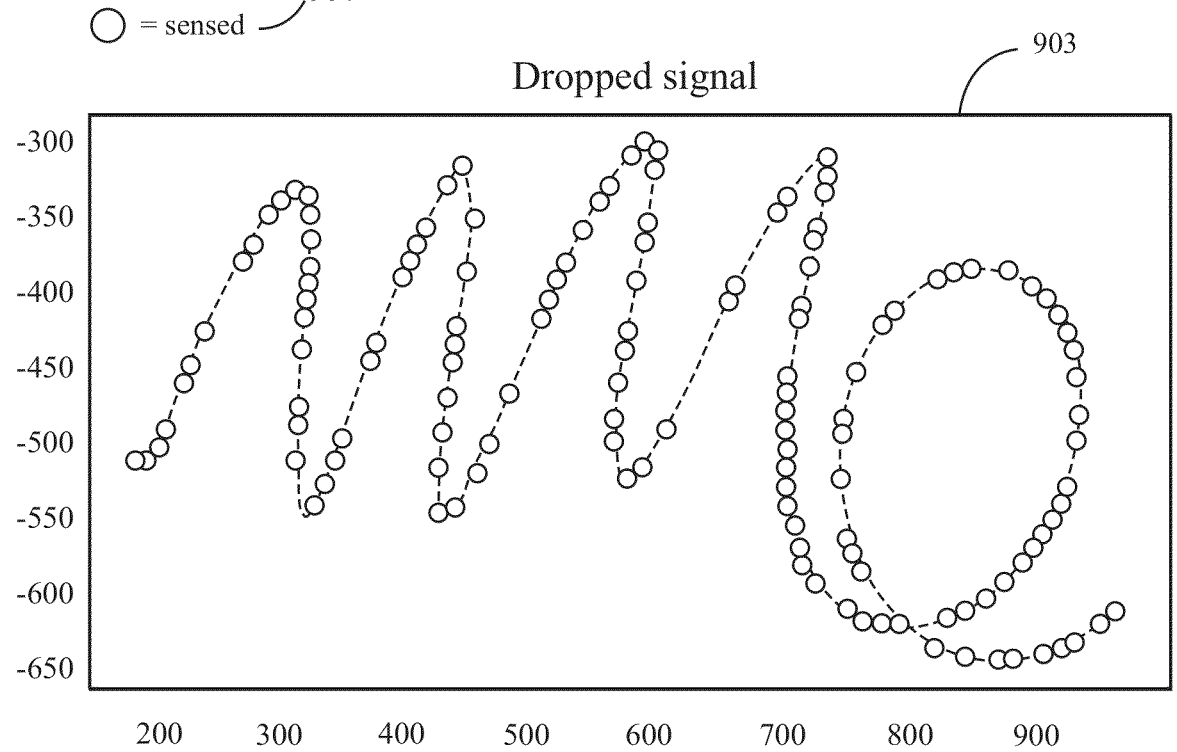
FIG. 9B illustrates an example of a drawing rendered from sensed points according to some examples of the disclosure.

FIG. 9B illustrates an example of a drawing rendered from sensed points 904 according to some examples of the disclosure. For example, the dots in FIG. 9B can correspond to the sensed points 904 in FIG. 9A. In some examples, the electronic device renders a drawing (e.g., the line shown in FIG. 9B connecting the dots) based on the sensed points 904 without performing interpolation of the skipped points 902.

Figure 9C:
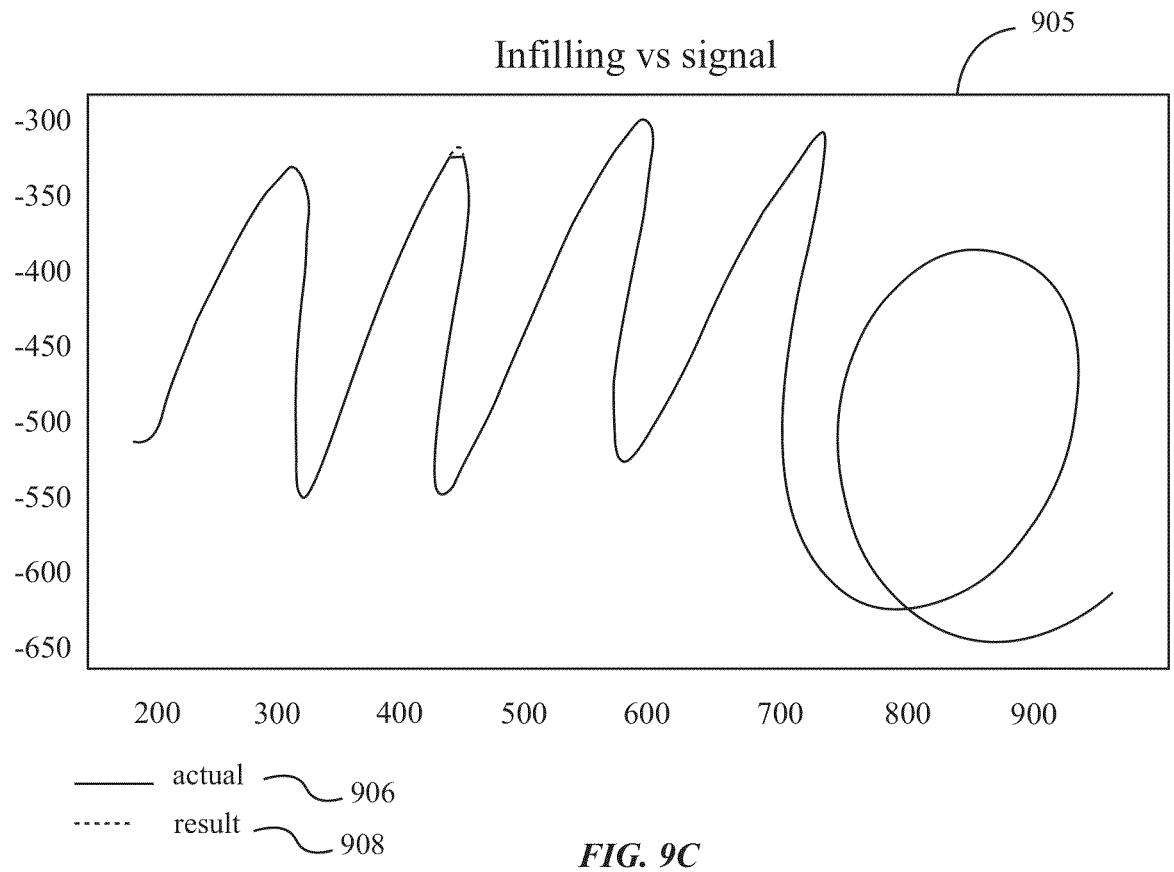
FIG. 9C illustrates an example drawing rendered from the sensed points using infilling techniques according to some examples of the disclosure.

FIG. 9C illustrates an example drawing rendered from the sensed points 904 using infilling techniques according to some examples of the disclosure. In some examples, the electronic device displays the drawing shown in blue in FIG. 9C based on the sensed data illustrated in FIG. 9B and infilling techniques described above. For example, the portions of the drawing in FIG. 9C illustrate differences between the drawing made by the user and the drawing displayed by the electronic device based on interpolation of the sensed data.

Figure 9D:
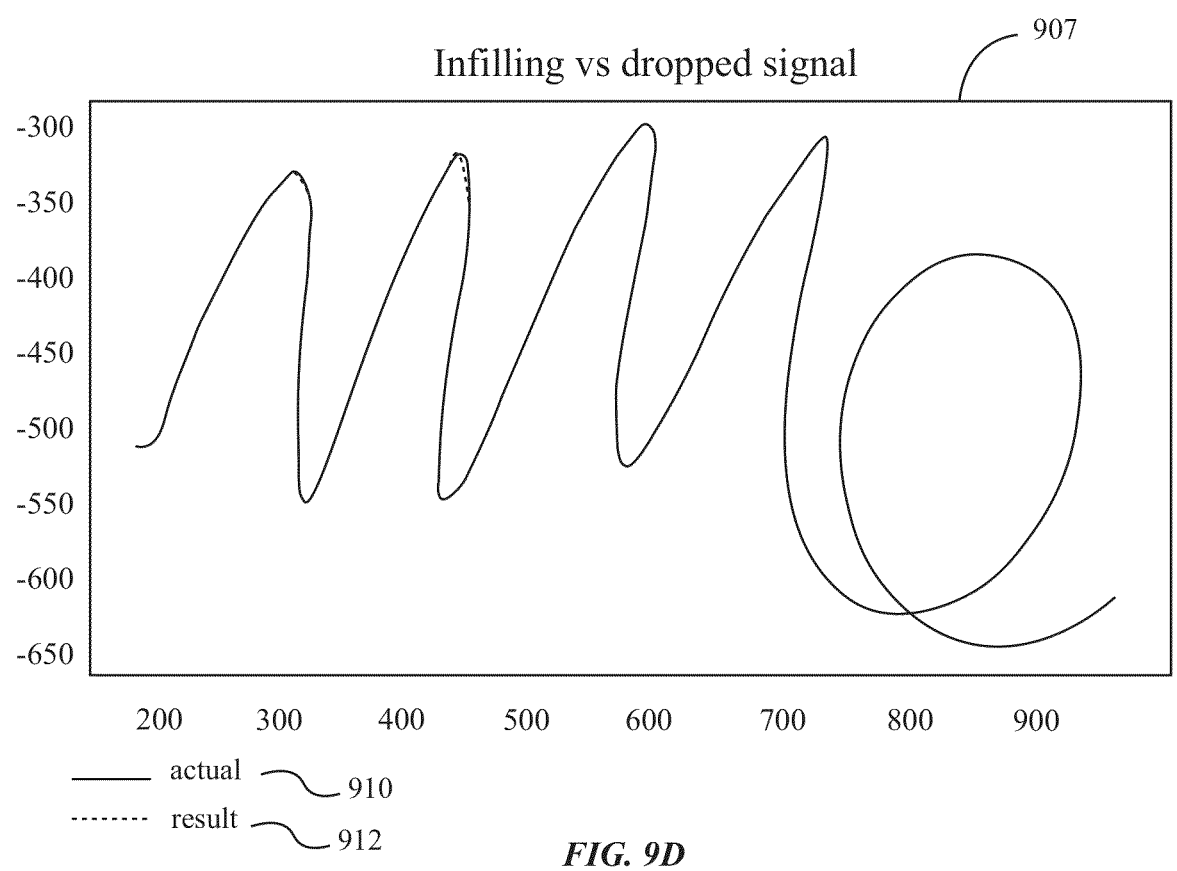
FIG. 9D illustrates an example drawing rendered using sensed points without using infilling techniques according to some examples of the disclosure.

FIG. 9D illustrates an example drawing rendered using sensed points 904 without using infilling techniques according to some examples of the disclosure. In some examples, the electronic device displays the drawing 910 in FIG. 9D based on the sensed data illustrated in FIG. 9B without performing infilling. For example, the portions 912 of the drawing in FIG. 9D illustrate differences between the drawing made by the user and the drawing displayed by the electronic device based on the sensed data without interpolation.

Some examples use machine learning models for infilling of noisy points. In some examples, this problem can be trained as a fully supervised task. For example, training data can be generated by collecting clean data and dropping points from the clean data to simulate points not sensed due to noise in the stylus data. In some examples, the clean data can be collected by increasing the stylus signal strength an using the stylus to write and/or draw on the touch screen.

An example approach uses continuous embedding techniques. For example, ideas from computational geometry can be used to learn an embedding of the continuous shape of the curve. In some examples, an encoder can be learned that produces a constant size embedding from an input sequence. To reconstruct the curve, the constant size embedding can be given to a decoder jointly with a timestamp of the desired location that should be reconstructed, for example. In some examples, multiple inference calls to the decoder can be used to reconstruct the curve. In some examples, stroke data can be encoded in such a model with a transformer and decoded with a small MLP network. In some examples, robustness to missing points can be achieved by training with augmented data (dropped points). In some examples, this method could be trained to work in both the online and offline use case. In some examples, the electronic device can use an autoregressive approach that includes estimating a noisy point based on one or more previously-sensed points. In some examples, if more than one sample in the row is impacted by noise, the electronic device can estimate the noisy points in order, and can include previously-estimated points in the data used to estimate a subsequent point.

An example approach uses fixed size input/output techniques. In some examples, a network that takes as input a set of points encoded as differences between consecutive points can be built. In this encoding missing points can be encoded as (0.0, 0.0), for example. In some examples, a network that takes as input a fixed dimensional vector of length 2*N (for N points) and outputs a vector of the same size can be trained with the goal that sensed points are unchanged but points with (0, 0) are replaced by their infilled coordinates estimated using one or more of the approaches discussed herein, including, but not limited to, polynomial interpolation and/or extrapolation, Bezier interpolation and/or extrapolation, and/or neural network approaches. In some examples, this method could be trained to work in both the online and offline use case.

An example approach uses next point prediction techniques. For example, these techniques can use an autoregressive recurrent model, e.g., like Graves handwriting generation method is a way to predict future points from past points.

Figure 10:
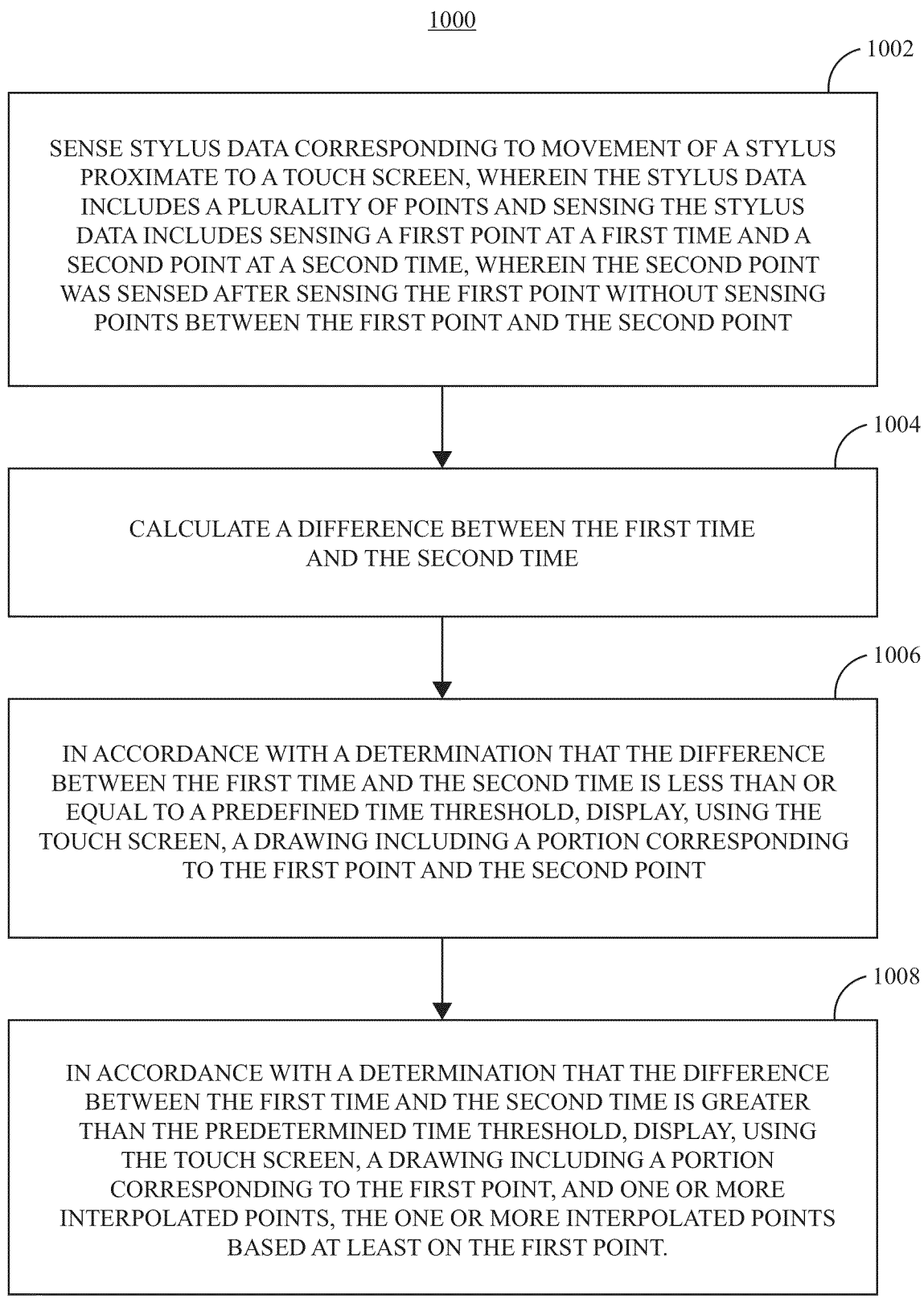
FIG. 10 illustrates an example method of correcting sensed stylus data using point infilling techniques described herein according to some examples of the disclosure.

FIG. 10 illustrates an example method 1000 of correcting sensed stylus data using point infilling techniques described herein according to some examples of the disclosure. In some examples, at block 1002, an electronic device senses stylus data corresponding to movement of a stylus proximate to the touch screen, wherein the stylus data includes a plurality of points and sensing the stylus data includes sensing a first point at a first time and sensing a second point at a second time, wherein the second point was sensed after sensing the first point without sensing points between the first point and the second point. In some embodiments, the electronic device scans for stylus data between sensing the first point and the second point but does not obtain data that appears to correspond to points because the data may be noisy.

In some examples, at block 1004, the electronic device calculates a difference between the first time and the second time. In some embodiments, at block 1006, in accordance with a determination that the difference between the first time and the second time is less than or equal to a predefined time threshold, the electronic device displays, using the touch screen, a drawing including a portion corresponding to the first point and the second point For example, the predefined time threshold can correspond to sensing consecutive points without skipping intermediate points due to noise. Thus, in some examples, detecting the second point within the predefined threshold time of detecting the first point can correspond to no points missing between the first point and the second point, and interpolation between the first point and the second point may therefore not be needed.

In some examples, at block 1008, in accordance with a determination that the difference between the first time and the second time is greater than the predetermined time threshold, the electronic device displays, using the touch screen, a drawing including a portion corresponding to the first point, the second point, and one or more interpolated points, the one or more interpolated points based at least on the first point. In some examples, more than the threshold amount of time passing between sensing the first point and sensing the second point can correspond to one or more points missing between the first point and the second point due to noise. In some examples, when one or more points are missing, the points can be infilled using one or more techniques described herein.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A method performed by an electronic device including memory and one or more processors coupled to a touch screen, the method comprising:

sensing stylus data corresponding to movement of a stylus proximate to the touch screen, wherein the stylus data includes a plurality of points and sensing the stylus data includes sensing a first point at a first time and sensing a second point at a second time, wherein the second point was sensed after sensing the first point without sensing points between the first point and the second point;

calculating a difference between the first time and the second time;

determining that the difference between the first time and the second time is less than or equal to a predefined time threshold;

in response to determining that that the difference between the first time and the second time is less than or equal to a predefined time threshold, displaying, using the touch screen, a drawing including a portion corresponding to the first point and the second point;

sensing second stylus data corresponding to movement of the stylus proximate to the touch screen, wherein the second stylus data includes a second plurality of points and sensing the second stylus data includes sensing a third point at a third time and sensing a fourth point at a fourth time, wherein the fourth point was sensed after sensing the third point without sensing points between the third point and the fourth point;

calculating a difference between the third time and the fourth time;

determining that the difference between the third time and the fourth time is greater than the predetermined time threshold; and in response to determining that the difference between the third time and the fourth time is greater than the predefined time threshold, displaying, using the touch screen, a second drawing including a portion corresponding to the third point, the fourth point, and one or more interpolated points, the one or more interpolated points based at least on the third point.

2. The method of claim 1, wherein the one or more interpolated points are further based on the fourth point.

3. The method of claim 1, wherein the one or more interpolated points are further based on one or more points sensed prior to sensing the third point.

4. The method of claim 1, wherein the one or more interpolated points are not sensed based on points sensed after sensing the fourth point.

5. The method of claim 1, wherein the one or more interpolated points are not sensed based on one or more points sensed after sensing the third point.

6. The method of claim 1, further comprising:

in response to determining that the difference between the third time and the fourth time is greater than the predefined time threshold:

determining, based on the difference between the third time and the fourth time, a number of points skipped between the third point and the fourth point, wherein the one or more interpolated points have a same number as the number of points skipped between the third point and the fourth point.

7. An electronic device in communication with a touch screen, the electronic device comprising:

memory; and one or more processors coupled to the memory and configured to perform a method comprising:

sensing stylus data corresponding to movement of a stylus proximate to the touch screen, wherein the stylus data includes a plurality of points and sensing the stylus data includes sensing a first point at a first time and sensing a second point at a second time, wherein the second point was sensed after sensing the first point without sensing points between the first point and the second point;

calculating a difference between the first time and the second time;

in accordance with a determination that the difference between the first time and the second time is less than or equal to a predefined time threshold, displaying, using the touch screen, a drawing including a portion corresponding to the first point and the second point; and in accordance with a determination that the difference between the first time and the second time is greater than the predetermined time threshold, displaying, using the touch screen, a drawing including a portion corresponding to the first point, the second point, and one or more interpolated points, the one or more interpolated points based at least on the first point.

8. The electronic device of claim 7, wherein the one or more interpolated points are further based on the second point.

9. The electronic device of claim 7, wherein the one or more interpolated points are further based on one or more points sensed prior to sensing the first point.

10. The electronic device of claim 7, wherein the one or more interpolated points are not sensed based on points sensed after sensing the second point.

11. The electronic device of claim 7, wherein the one or more interpolated points are not sensed based on one or more points sensed after sensing the first point.

12. The electronic device of claim 7, wherein the method further comprises:

in accordance with the determination that the difference between the first time and the second time is greater than the predetermined time threshold:
determining, based on the difference between the first time and the second time, a number of points skipped between the first point and the second point, wherein the one or more interpolated points have a same number as the number of points skipped between the first point and the second point.

13. The electronic device of claim 7, wherein locations of the one or more interpolated points are determined using one or more of polynomial interpolation, Bezier interpolation, a neural network, continuous embedding techniques, and/or an autoregressive recurrent model.

14. A non-transitory computer readable storage medium storing instructions that, when executed by an electronic device including memory and one or more processors, the electronic device in communication with a touch screen, cause the electronic device to perform a method comprising:

sensing stylus data corresponding to movement of a stylus proximate to the touch screen, wherein the stylus data includes a plurality of points and sensing the stylus data includes sensing a first point at a first time and sensing a second point at a second time, wherein the second point was sensed after sensing the first point without sensing points between the first point and the second point;

calculating a difference between the first time and the second time;

in accordance with a determination that the difference between the first time and the second time is less than or equal to a predefined time threshold, displaying, using the touch screen, a drawing including a portion corresponding to the first point and the second point; and in accordance with a determination that the difference between the first time and the second time is greater than the predetermined time threshold, displaying, using the touch screen, a drawing including a portion corresponding to the first point, the second point, and one or more interpolated points, the one or more interpolated points based at least on the first point.

15. The non-transitory computer readable storage medium of claim 14, wherein the one or more interpolated points are further based on the second point.

16. The non-transitory computer readable storage medium of claim 14, wherein the one or more interpolated points are further based on one or more points sensed prior to sensing the first point.

17. The non-transitory computer readable storage medium of claim 14, wherein the one or more interpolated points are not sensed based on points sensed after sensing the second point.

18. The non-transitory computer readable storage medium of claim 14, wherein the one or more interpolated points are not sensed based on one or more points sensed after sensing the first point.

19. The non-transitory computer readable storage medium of claim 14, wherein the method further comprises:

in accordance with the determination that the difference between the first time and the second time is greater than the predetermined time threshold:
determining, based on the difference between the first time and the second time, a number of points skipped between the first point and the second point, wherein the one or more interpolated points have a same number as the number of points skipped between the first point and the second point.

20. The non-transitory computer readable storage medium of claim 14, wherein locations of the one or more interpolated points are determined using one or more of polynomial interpolation, Bezier interpolation, a neural network, continuous embedding techniques, and/or an autoregressive recurrent model.

* * * * *